United States Patent
Berg et al.

(10) Patent No.: US 7,174,837 B2
(45) Date of Patent: *Feb. 13, 2007

(54) THREE-PIECE MOTION CONTROL TRUCK SYSTEM

(75) Inventors: Thomas R. Berg, St. Louis, MO (US); Nathan J. Reese, Troy, IL (US); Ralph H. Schorr, Edwardsville, IL (US); Jeffrey M. Ruback, Edwardsville, IL (US); Julius I. Pershwitz, Grantham, PA (US)

(73) Assignee: ASF-Keystone, Inc., Granite City, IL (US)

( * ) Notice: Subject to any disclaimer, the term of this patent is extended or adjusted under 35 U.S.C. 154(b) by 29 days.

This patent is subject to a terminal disclaimer.

(21) Appl. No.: 10/873,126

(22) Filed: Jun. 23, 2004

(65) Prior Publication Data

US 2004/0261652 A1    Dec. 30, 2004

Related U.S. Application Data

(60) Provisional application No. 60/482,132, filed on Jun. 25, 2003.

(51) Int. Cl.
*B61D 1/00* (2006.01)

(52) U.S. Cl. .............. 105/197.05; 105/198.2; 105/198.4; 105/453

(58) Field of Classification Search .............. 105/198.2, 105/198.3, 198.4, 198.5, 199.3, 157.1, 182.1, 105/197.05, 197.2, 198.1, 198.7, 199.2, 199.1, 105/453

See application file for complete search history.

(56) References Cited

U.S. PATENT DOCUMENTS

| | | | |
|---|---|---|---|
| 4,938,152 A | 7/1990 | List | |
| 5,562,045 A | 10/1996 | Rudibaugh et al. | |
| 5,601,031 A * | 2/1997 | Carlson | 105/199.3 |
| 5,806,435 A * | 9/1998 | Pitchford | 105/199.3 |
| 5,943,961 A | 8/1999 | Rudibaugh et al. | |
| 6,371,033 B1 * | 4/2002 | Smith et al. | 105/157.1 |
| 6,895,866 B2 * | 5/2005 | Forbes | 105/197.05 |

FOREIGN PATENT DOCUMENTS

CA    2 396 525 A1    2/2003

OTHER PUBLICATIONS

Co-pending U.S. Appl. No. 10/770,463, filed Feb. 4, 2004.
Co-pending U.S. Appl. No. 10/808,535, filed Mar. 25, 2004.
Adapter Plus, Pennsy Corporation, Version 9807, date-unknown, www.Pennsy.com/AdapterPlus/AdapterPlus.pdf.
Bearing Adapter Pad, Lord Corporation, date-unknown, www.lord.com/Default.aspx?tabid=859.

* cited by examiner

*Primary Examiner*—Mark T. Le
(74) *Attorney, Agent, or Firm*—Oliff & Berridge, PLC

(57) ABSTRACT

An improved three-piece truck system for railroad cars provides long travel side bearings for improved stability, a "wide" friction shoe design or equivalent to improve sideframe and bolster squareness, a resilient pedestal pad for improved curving performance and enhanced wear resistance, and a suspension system tuned and optimized for rail cars to have a minimum reserve capacity of less than 1.5 to improve motion control and ride quality, increase resistance to suspension bottoming, and increase hunting threshold speed. Such a motion control truck system is able to meet recent, more stringent American Association of Railroads standards, such as M-976, for railcars having a 286,000 lb. gross rail load rating.

22 Claims, 16 Drawing Sheets

270

270

270

TRACK SURFACE VARIATION FOR PITCH AND BOUNCE

| SET # | SPRING | BAR DIAMETER | OUTSIDE DIAMETER | SOLID HEIGHT | FREE HEIGHT | TRAVEL | LOAD RATE | SOLID LOAD | SOLID STRESS | LOADED HEIGHT | LOAD @ HEIGHT |
|---|---|---|---|---|---|---|---|---|---|---|---|
| 1 | 130A | 0.94 | 5.72 | 3.75 | 5.30 | 1.55 | 3607 | 5590 | 125553 | 4.56 | 2660 |
|   | 130B | 0.66 | 3.70 | 3.75 | 5.25 | 1.50 | 2084 | 3125 | 125562 | 4.56 | 1432 |
|   | 130C | 0.44 | 2.20 | 3.75 | 5.00 | 1.25 | 1298 | 1623 | 129544 | 4.56 | 568 |
|   |      |      |      |      |      |      | 6989 |      |        |      | 4660 |
| 2 | 130A | 0.94 | 5.72 | 3.75 | 5.30 | 1.55 | 3607 | 5590 | 125553 | 4.56 | 2660 |
|   | 130B | 0.66 | 3.70 | 3.75 | 5.45 | 1.70 | 1563 | 2658 | 123090 | 4.56 | 1388 |
|   | 130C | 0.44 | 2.30 | 3.88 | 5.30 | 1.43 | 1059 | 1509 | 124716 | 4.56 | 781 |
|   |      |      |      |      |      |      | 6229 |      |        |      | 4828 |
| 3 | 130A | 0.94 | 5.72 | 3.75 | 5.30 | 1.55 | 3607 | 5590 | 125553 | 4.50 | 2885 |
|   | 130B | 0.66 | 3.70 | 3.75 | 5.25 | 1.50 | 2084 | 3125 | 126562 | 4.50 | 1563 |
|   | 130C | 0.44 | 2.30 | 3.88 | 5.30 | 1.43 | 1059 | 1509 | 124716 | 4.50 | 847 |
|   |      |      |      |      |      |      | 6750 |      |        |      | 5295 |
| 4 | 130A | 0.94 | 5.72 | 3.75 | 5.30 | 1.55 | 3607 | 5590 | 125553 | 4.44 | 3111 |
|   | 130B | 0.66 | 3.70 | 3.75 | 5.25 | 1.50 | 2084 | 3125 | 126562 | 4.44 | 1693 |
|   | 130C | 0.44 | 2.20 | 3.75 | 5.00 | 1.25 | 1298 | 1623 | 129544 | 4.44 | 730 |
|   |      |      |      |      |      |      | 6989 |      |        |      | 5534 |
| 5 | 130A | 0.94 | 5.72 | 3.68 | 5.30 | 1.62 | 3705 | 6003 | 135345 | 4.44 | 3196 |
|   | 130B | 0.66 | 3.70 | 3.68 | 5.25 | 1.57 | 2134 | 3350 | 135977 | 4.44 | 1734 |
|   | 130C | 0.44 | 2.23 | 3.68 | 5.00 | 1.32 | 1261 | 1665 | 134589 | 4.44 | 710 |
|   |      |      |      |      |      |      | 7097 |      |        |      | 5639 |
| 6 | 130A | 0.88 | 5.70 | 3.68 | 5.72 | 2.04 | 2483 | 5065 | 137012 | 4.44 | 3184 |
|   | 130B | 0.63 | 3.75 | 3.68 | 5.56 | 1.88 | 1525 | 2871 | 134812 | 4.44 | 1716 |
|   | 130C | 0.38 | 2.25 | 3.68 | 5.75 | 2.07 | 498  | 1031 | 129039 | 4.44 | 654 |
|   |      |      |      |      |      |      | 4506 |      |        |      | 5554 |

Fig. 23

THREE-PIECE MOTION CONTROL TRUCK SYSTEM

This nonprovisional application claims the benefit of U.S. Provisional Application No. 60/482,132, filed Jun. 25, 2003.

BACKGROUND OF THE INVENTION

1. Field of Invention

The present invention relates to an improved three-piece truck system for railroad cars that provides long travel constant contact side bearings for improved stability, a friction shoe having improved squareness, a resilient pedestal pad for improved curving performance and increased wear resistance, and a suspension system tuned and optimized for rail cars that improves ride quality, increases resistance to suspension bottoming, and increases hunting threshold speed. The motion control truck system is believed to meet or exceed recent American Association of Railroads (AAR) M-976 requirements.

2. Description of Related Art

Opposed ends of railway cars are commonly supported on spaced-apart truck assemblies that allow travel of the railway car along a railway track. A standard railway car includes a pair of railway car trucks that include a pair of sideframes supported on a pair of axles, each provided with a pair of wheels secured to each axle and spaced from each other by a distance corresponding to the gauge of the associated railway track. Side frames are longitudinally operable along the track and run parallel to the longitudinal axis of the rail car. Side frames include a top member, a compression member, a tension member, a column, a gib, a pedestal, and a pedestal roof.

A hollow bolster is transversely positioned to the longitudinal axis of the railway car, couples the sideframes, and has the car body supported thereon. A bolster center bowl is provided having a central opening. The bolster center bowl receives and supports a protruding circular center plate of a draft sill associated with a carbody. The truck center bowl provides the principal bearing surface to support the carbody on the truck bolster. Truck center bowls are often fitted with a horizontal wear plate and a vertical wear ring to improve wear characteristics and extend the service life of the associated truck bolster.

Each sideframe includes a window portion for bolster ends and spring groups supporting the bolster, which allows bolster movement relative to the sideframe. Each spring group typically includes a plurality of coil springs extending between a sideframe spring seat portion and an undersurface of the bolster end spaced above the respective sideframe spring-seat.

Side bearings may also be disposed between the truck bolster and carbody, typically provided laterally to each side of center plate bowl on bolster on the bearing pads. Constant contact side bearings are commonly used on railroad car trucks. They are typically located on the truck bolster, such as on side bearing pads, but may be located elsewhere. Some prior designs have used a single helical spring mounted between a base and a cap. Others use multiple helical springs or elastomer elements.

The size capacity of Association of American Railroads (AAR) standard freight car trucks are commonly indicated by nominal or rated load carrying capacity of a railway car equipped with such trucks. Typical truck size indications are 40 ton, 50 ton, 70 ton, 100 ton, and 125 ton. A more specific indication of truck size is the total allowable gross weight on rail of a railway car equipped with the particular size truck. Examples of such truck size indications are 142,000 lbs, 177,000 lbs, 220,000 lbs, 263,000 lbs, and 315,000 lbs, respectively. Since 1994, AAR standard freight car trucks have been commercially available for gross weight on rail railway cars with 286,000 pound ratings.

Total allowable or maximum gross weight on rail for a railway truck is generally determined by the capacity of the journal bearings on the associated railway truck axles. Also, associated with each nominal railway car truck size is a given wheel diameter size to limit maximum wheel/rail contact stress. Examples of typical journal bearing sizes and wheel sizes for AAR standard freight car trucks are included in the following table.

TABLE 1

| Nominal Truck Size | Maximum Gross Weight on Rail | Journal Bearing Size | Wheel Size Diameter |
| --- | --- | --- | --- |
| 40 ton | 142,000 lbs | 5 in × 9 in | 33 in |
| 50 ton | 177,000 lbs | 5.5 in × 10 in | 33 in |
| 70 ton | 220,000 lbs | 6 in × 11 in | 33 in |
| 100 ton | 263,000 lbs | 6.5 in × 12 in | 36 in |
| 125 ton | 315,000 lbs | 7 in × 12 in | 38 in |

The Association of American Railroads (AAR) establishes the criteria for railcar stability, wheel loading and spring group structure. These criteria are set or defined in recognition that railcar body dynamic modes of vibration, such as rocking of sufficient magnitude, may compress individual springs of the spring group at alternate ends of the bolster, even to a solid or near-solid condition. This alternate-end spring compression is followed by an expansion of the springs, which action-reaction can amplify and exaggerate the "apparent" wheel loading on the suspension system and subsequent rocking motion of the railcar, as opposed to the actual or "average" weight or load from the railcar and therein. As a consequence of the amplified rocking motion, and at large amplitudes of such rocking motion, the contact force between the rails and the wheels can be dramatically reduced on the alternate lateral sides of the railcar. In an extreme case, the wheels can elevate and misalign from the track, which enhances the opportunity for a derailment.

There are various modes of motion of a railcar body, that is bounce, pitch, yaw, and lateral oscillation, as well as the above-noted roll. In car body roll, or twist and roll as defined by the AAR, the car body appears to be alternately rotating in the direction of either lateral side and about a longitudinal axis of the railcar. Car body pitch can be considered a forward to rearward rotational motion about a transverse railcar axis of rotation, such that the railcar may appear to be lunging between its forward and reverse longitudinal directions. Car body bounce refers to a vertical and linear motion of the railcar. Yaw is considered a rotational motion about a vertical axis extending through the railcar, which gives the appearance of the car ends moving to and fro as the railcar moves down a track. Finally, lateral stability is considered an oscillating lateral translation of the car body. Alternatively, truck hunting refers to a parallelogramming or warping of the railcar truck, not the railcar body, which is a separate phenomena distinct from the railcar body motions noted above. Truck hunting is also an oscillating lateral translation of the wheel sets due to the wheels being conical in cross section. All of these motion modes are undesirable and can lead to unacceptable railcar performance, as well as contributing to unsafe operation of the railcar.

A common apparatus utilized to control the dynamic responses of railcar trucks and bodies is a friction shoe assembly, which provides bolster-to-sideframe damping of oscillating motion. Friction shoes include a friction wedge in a bolster pocket in which the wedge is biased to maintain frictional engagement with the sideframe. Friction shoes dissipate suspension system energy by frictionally damping relative motion between the bolster and sideframe.

Friction shoes are most generally utilized with constant or fixed bias frictional damping structures with the friction shoes contacting complementary inner surfaces of the bolster pockets: A retention or control spring, which biases the friction shoe and maintains it against the bolster pocket surface and the sideframe column wear surface, is supported by the spring base or seat portion of the sideframe beneath the friction shoe. With a fixed or constant bias or damping spring group, the control springs do not carry load and the compression rate of the friction shoe assembly spring, that is the spring displacement as a function of the force, remains essentially unchanged during relative movement between the bolster and sideframe. Thus, in a constant bias arrangement, the biasing force applied to the friction shoe remains constant throughout the operating ranges for both the relative motion and biasing spring displacement between the bolster and sideframes for all conditions of railcar loading. Consequently, the frictional force between the friction shoe and column wear surfaces remains relatively constant.

Alternatively, the response of friction shoes in variable bias arrangements varies with the compressed length of the retention spring. Therefore, the frictional force between the friction shoe and the sideframe column varies with the vertical movement of the bolster. However, in a variable rate spring structure, the operating range, or the spring rate, of the control spring may not be adequate to respond to the applied forces, that is the railcar weight and the oscillating dynamic forces, from variations in the track and operating conditions. In at least some variable friction force arrangements, the distance between the friction shoe and the sideframe spring seat has been considered to be adequate to accommodate a friction-shoe biasing spring with a suitable design characteristic to handle the force variations and ranges in the railcar wheel-truck assembly, even for railcars with a higher-rated, load-bearing capacity.

In fixed or constant biasing arrangements, the friction shoe frequently has a spring pocket to receive a control spring having adequate length and coil diameter to provide the requisite frictional damping.

The spring group arrangements along with the friction shoes support the railcar and damp the relative interaction between the bolster and sideframe. There have been numerous types of spring groups utilized for railcar suspension systems, such as concentric springs within the spring group; five, seven and nine spring arrangements; elongated springs for the friction shoe; and, short spring-long spring combinations for the friction shoe within the multi-spring set. These are just a few of the many noted spring arrangements that have been positioned between sideframe and bolster end assemblies. These spring assemblies must conform to standards set by the Association of American Railroads (AAR), which prescribes a fixed spring height for each coil spring at the fully-compressed or solid spring condition. The particular spring arrangement for any railcar is dependent upon the physical structure of the railcar, its rated weight-carrying capacity and the structure of the wheel-truck assembly. That is, the spring group arrangement must be responsive to variations in the track as well as in the railcar such as the empty railcar weight, the laden-to-capacity railcar weight, railcar weight distribution, railcar operating characteristics, available vertical space between the sideframe spring-platform and the bolster end, the specific friction shoe design and, other operating and physical parameters.

Prior spring group designs have been limited to minimum reserve capacities of 1.5 per AAR standards S-259 and Rule 88. Although the minimum allowable reserve capacity is 1.5 per AAR standards, suspension reserve capacity for friction damped car suspensions has been reduced for railroad cars hauling automobiles, because they are equipped with their own suspensions. Reducing reserve capacity for these types of loads was considered acceptable to improve ride quality. With the exception of railroad cars hauling automobiles, the AAR minimum reserve capacity of 1.5 was thought to be the minimum allowable spring capacity to prevent suspension bottoming. However, the prior art did not consider the length of the car or the interaction of the suspension systems within a car. The same suspension design and damping was used for all car types.

The railcar must be physically able to bear the rated load weight and maintain contact with the track as the car travels at varying speeds along different track contours with varying track conditions. Simultaneously, the railcar and truck assemblies must have operating characteristics enabling it to be safely operable on these same varying track conditions at the unloaded, empty-car condition. Both operating weight extremes must be accommodated without posing the danger of imminent derailment for either condition.

To provide a railcar with the above-required operating range capabilities, the damping system spring group incorporated into the truck assembly must have certain static and dynamic operating characteristics. That is, operation of a car in motion on a rail track with a wide variant of track and contour conditions can lead to dynamic operating problems from oscillations, which can progress to uncontrolled instabilities of the railcar especially in super elevated curves. Track-to-wheel separation is a result of several conditions, including traversal of rail imperfections, and in conjunction with the oscillation frequency of the car from traversing the non-uniform tracks, disengagement of a wheel of an unloaded railcar is not an unusual condition. Although wheel disengagement from the track does not generally result in a derailment, the implied hazard from such a separation is readily apparent and should be avoided, if possible.

One of the primary methods for dealing with the oscillations of a railcar and truck assembly is the damping from the above-noted friction shoe, as well as the stabilizing effect of the supporting springs. These oscillations may be due in part to the physical track conditions experienced by railway cars during their operation. Variations in track conditions, for example, track joints, can affect operation of the truck assembly, which track variation effects may be amplified as they are transferred through the wheel, axle and suspension to the frame. This may affect operation of the railcar as it traverses the track and encounters more of these track-induced operating problems.

Typical side bearing arrangements are designed to control hunting of the railroad car. That is, as the semi-conical wheels of the railcar truck ride along a railroad track, a yaw axis motion is induced in the railroad car truck. As the truck yaws, part of the side bearing is made to slide across the underside of the railroad car body. The resulting friction produces an opposing torque that acts to prevent this yaw motion. Another purpose of railroad car truck side bearings is to control or limit the roll motion of the car body. Most prior side bearing designs limited travel of the bearings to about $5/16"$. The maximum travel of such side bearings is specified by the Association of American Railroads (AAR)

standards. Previous standards, such as M-948-77, limited travel to 5/16" for many applications.

New standards have evolved that require railway car trucks to meet more stringent requirements. The most recent AAR standard is M-976, which is applicable to railway car having a gross rail load in excess of 268,000 lbs.

SUMMARY OF THE INVENTION

There is a need for improved trucks systems for railway cars that can meet these new AAR standards, such as M-976 or Rule 88 of the AAR Office Manual.

There also is a need for an improved railway truck having a set of design features that work in concert to provide improved motion control and handling characteristics, particularly beneficial when carrying high capacity loads.

The above and other advantages are achieved by various embodiments of the invention.

In preferred embodiments, an improved motion control truck incorporates two or more of the following features: long travel constant contact side bearings; a "wide" friction shoe design or comparable alternative, such as a split wedge friction shoe, or a compound slope angle shoe, with increased squareness; resilient elastomeric pedestal pads; and a suspension system "tuned" and optimized to have a minimum reserve capacity of less than 1.5. In a most preferred embodiment, all four design features are incorporated into a motion control truck and are believed to have a synergistic effect that enables the truck to meet or exceed recent AAR standards, such as M-976 for railcars having a 286,000 lb. gross rail load rating.

Long travel side bearings can be achieved by any of various conventional or subsequently developed designs in which travel of the side bearing is allowed to be in excess of 5/16", preferably at least 5/8". For example, this may be achieved using a resilient urging element, such as an elastomeric element or one or more springs located between a base and a cap. In exemplary embodiments, long travel can be achieved in a side bearing arrangement for railroad car trucks by a combination of features, including reduction of base and/or cap heights and/or reduction of the resilient urging element solid height to accommodate at least 5/8" travel before the urging element is fully compressed (solid) and before the base and cap bottom out.

In exemplary embodiments, improved operation of the side bearing, including improved control and hunting characteristics, is achieved by careful control of longitudinal clearances between the cap and base. This has been found to be important to prevent excessive movement between the cap and base, as well as reduce associated impact forces, stresses and wear.

In exemplary embodiments, improved tracking, curving and load leveling characteristics are achieved without adversely affecting hunting characteristics by changing the spring constant of the side bearing to be within a predetermined range, preferably between 4000–6000 lb/in.

In exemplary embodiments, a better contact surface arrangement with a car body wear plate is achieved by coping the cap corners of the side bearing and increasing the flatness of the cap top contact surface to improve wear characteristics, such as reduced gouging.

In exemplary embodiments, improved squaring is achieved by use of a wide friction shoe design. In one particular embodiment, the friction shoe is about 8" or wider, compared to a typical 5½" friction shoe.

In exemplary embodiments, improved squareness may also be achieved using a split wedge friction shoe design or a shoe with a compound slope angle for increased squareness.

In exemplary embodiments, improved curving is achieved by use of a resilient elastomeric pedestal pad.

In exemplary embodiments, the truck is formed of a lightweight casting to allow higher payload capacity.

In exemplary embodiments, improved ride quality, resistance to bottoming and increased hunting threshold speed is achieved by improved tuned suspension having coil groups with a minimum reserve capacity of less than 1.5. This can be achieved by, for example, reducing the total number of springs or replacing the type of springs used.

BRIEF DESCRIPTION OF THE DRAWINGS

The invention will be described with reference to the following drawings, wherein:

FIG. 23 is a table of exemplary side bearing spring combinations usable with the invention;

DETAILED DESCRIPTION OF PREFERRED EMBODIMENTS

Figure 1:
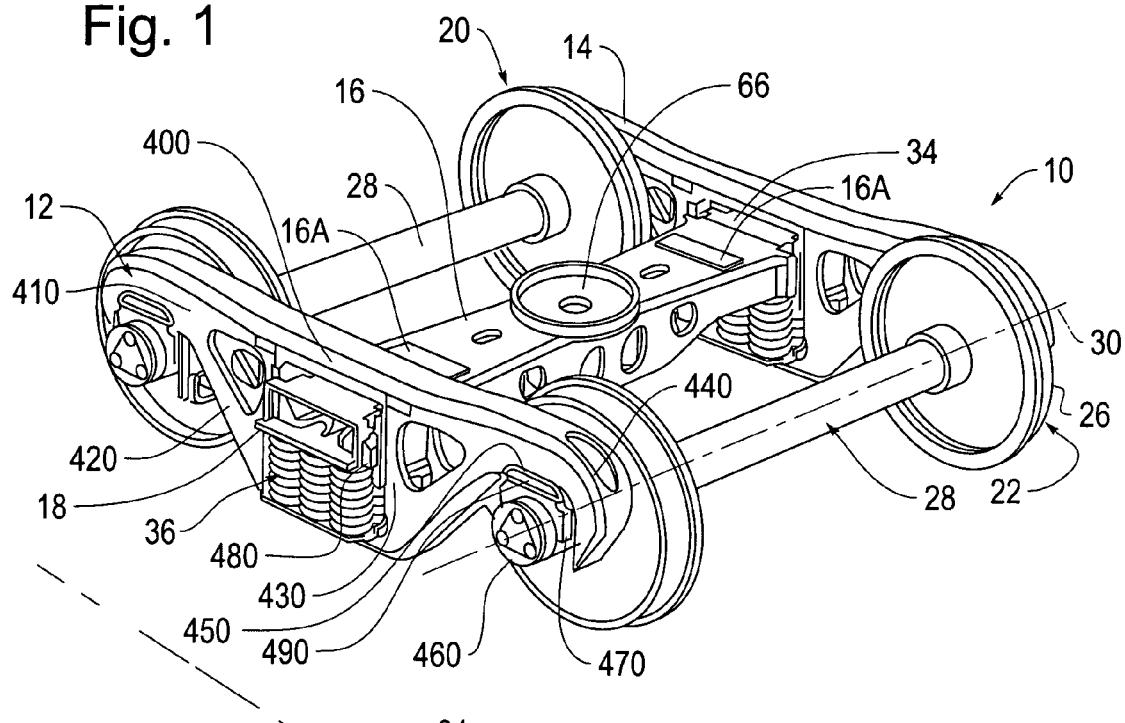
FIG. 1 is an oblique view of a railcar wheel truck assembly.

An exemplary railcar wheel truck assembly 10, as shown in FIG. 1, has a first sideframe 12 and a second sideframe 14, which are arranged in parallel alignment. Transverse bolster 16 couples first and second sideframes 12 and 14 generally at their respective spring windows 18, which are about at the longitudinal midpoint of first and second sideframes 12, 14. First axle and wheel set 20 and second axle and wheel set 22 are positioned at the opposed ends of aligned sideframes 12 and 14. Each of first and second axle and wheel set 20, 22 has an axle axis 30 generally transverse to the longitudinal axis 31 of first and second sideframes 12, 14 and about parallel to bolster 16. Each of first and second wheel sets 20, 22 include wheels 24 and 26 and axle 28 with axle axis 30.

Figure 2:
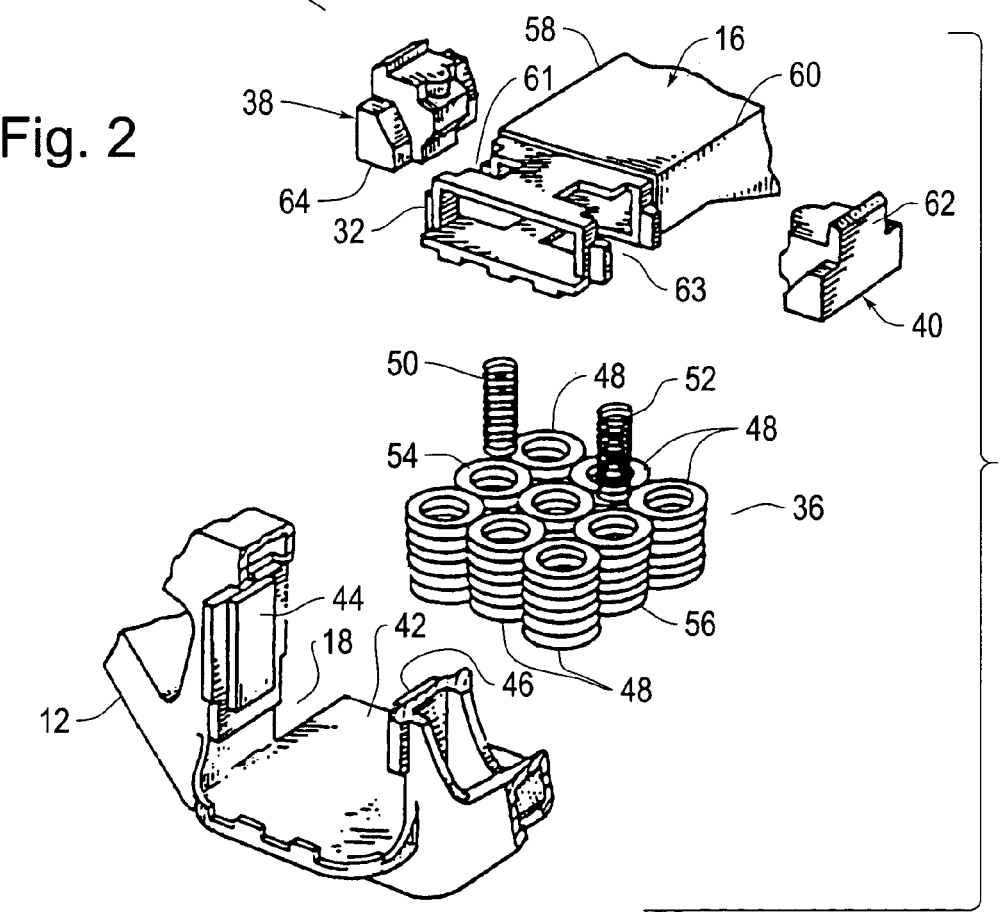
FIG. 2 is an exploded view in partial section of a sideframe, spring group, bolster end and friction shoes at one side of the wheel truck assembly of FIG. 1.

Bolster 16 has first end 32 and second end 34, which respectively extend through windows 18 of first and second sideframes 12 and 14 in FIG. 1. Window 18, bolster end 32, spring group 36, first friction shoe 38 and second friction shoe 40 of sideframe 12 are shown in FIG. 2 in an enlarged, partially sectioned and exploded view. As bolster ends 32 and 34, first and second sideframes 12 and 14, and sideframe windows 18 are structurally and functionally similar, only bolster end 32 at first sideframe 12 will be described, but the description is also applicable to bolster end 34 and window 18 of second sideframe 14.

In FIG. 2, sideframe window 18 has lower support platform 42 with first and second upright side columns or side faces 44 and 46, respectively, extending vertically from platform 42. Spring group 36 is shown as a three by three matrix of load springs 48, 54 and 56. In this matrix, first inner control spring 50 and second control spring 52 are concentrically positioned in outer control springs 54 and 56, respectively, to provide control spring subassemblies, which control springs 50, 52, 54 and 56 are also railcar load-bearing elements. Load springs 48, or load spring subassemblies may include 1, 2 or 3 individual springs concentrically arranged in a manner to meet design criteria or to provide optimum dynamic performance of suspension spring group 36.

The spring group 36 may be tuned by changing the number of springs, arrangement of springs, and/or type of springs. Thus, as used herein, the term "tuned spring group" is defined to mean a spring group that has been modified from a standard spring group design (typically having a reserve capacity of greater than 1.5 in accordance with AAR requirements in effect at the time of the invention herein) by the removal, replacement and/or rearrangement of certain types of springs in the standard group without the addition of any other devices, such as, for example, the addition of hydraulic damping devices, in place thereof within the spring group assembly, which tuning desirably reduces the reserve capacity of the spring group as described herein. Removal of springs involves removing one or more springs of a set of springs or removing a set of springs within the spring group. Replacement of certain types of springs involves replacing one or more springs of a set of springs or replacing a set of springs within the spring group with a different spring or set of springs of, for example, a spring of different stiffness, size, or the like. Examples of tuned spring group assemblies are further discussed below.

Figure 3:
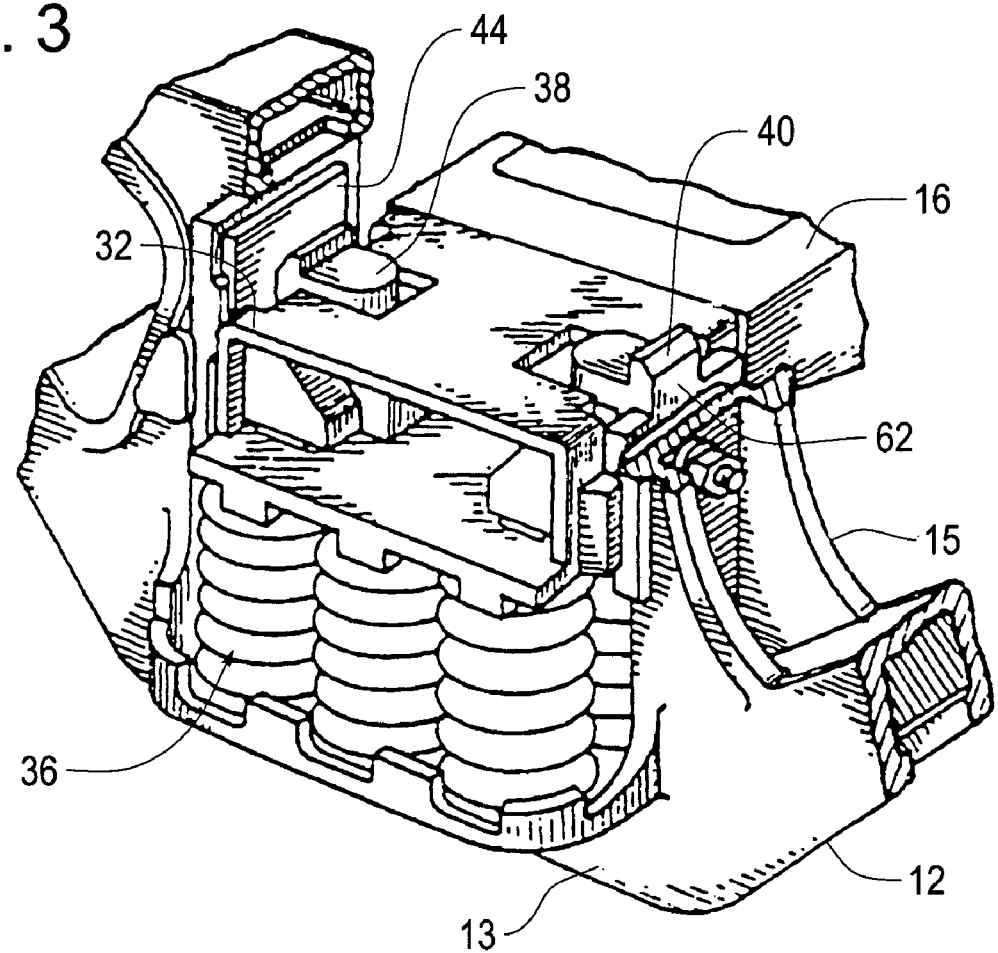
FIG. 3 is an oblique view of the assembled wheel truck assembly section illustrated in FIG. 2.
Figure 4:
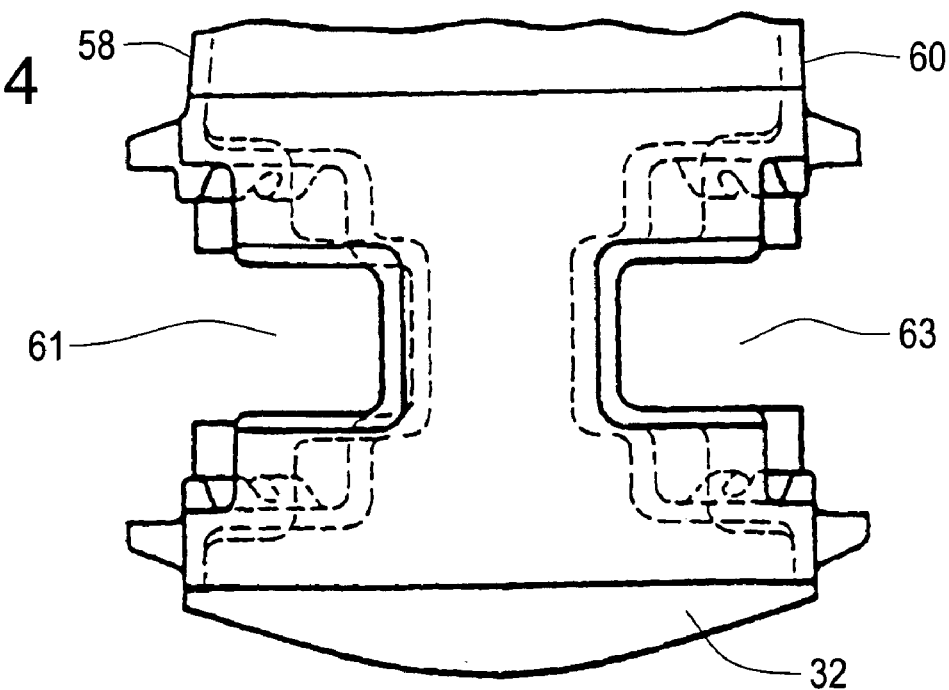
FIG. 4 is a plan view of a bolster end and its friction shoe pockets.
Figure 5:
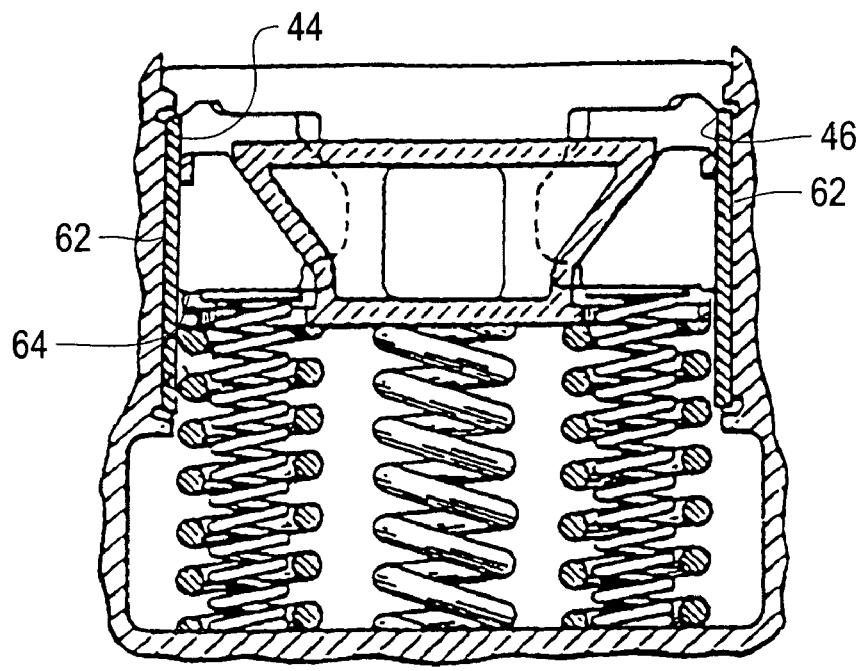
FIG. 5 is an elevational view in section of the spring group, bolster end and friction shoes.

Bolster end 32 in FIGS. 2 and 4 has forward friction shoe pocket 61 at bolster forward edge 58 and rear friction shoe pocket 63 at bolster rear edge 60, which friction shoe pockets 61 and 63 receive first and second friction shoes 38 and 40, respectively, for sliding operation therein. The several elements of sideframe 12, bolster 16 and spring group 36 of FIG. 2 are shown in the assembled form in FIG. 3. In this figure, the interface contact is noted between side column wear face 46 (FIG. 2) and friction face 62 of friction shoe 40. A similar friction face 62 is also present on friction shoe 38 and other friction shoes of wheel trucks. It is the frictional interface action between a friction shoe and a wear face, such as friction shoe 40 and wear face 46, which provides the damping force of the friction shoe. The biasing force applied to friction shoes 38, 40 is provided by control springs 50, 52, 54 and 56, at friction shoe lower surfaces 64, as noted in FIG. 5.

Figure 6:
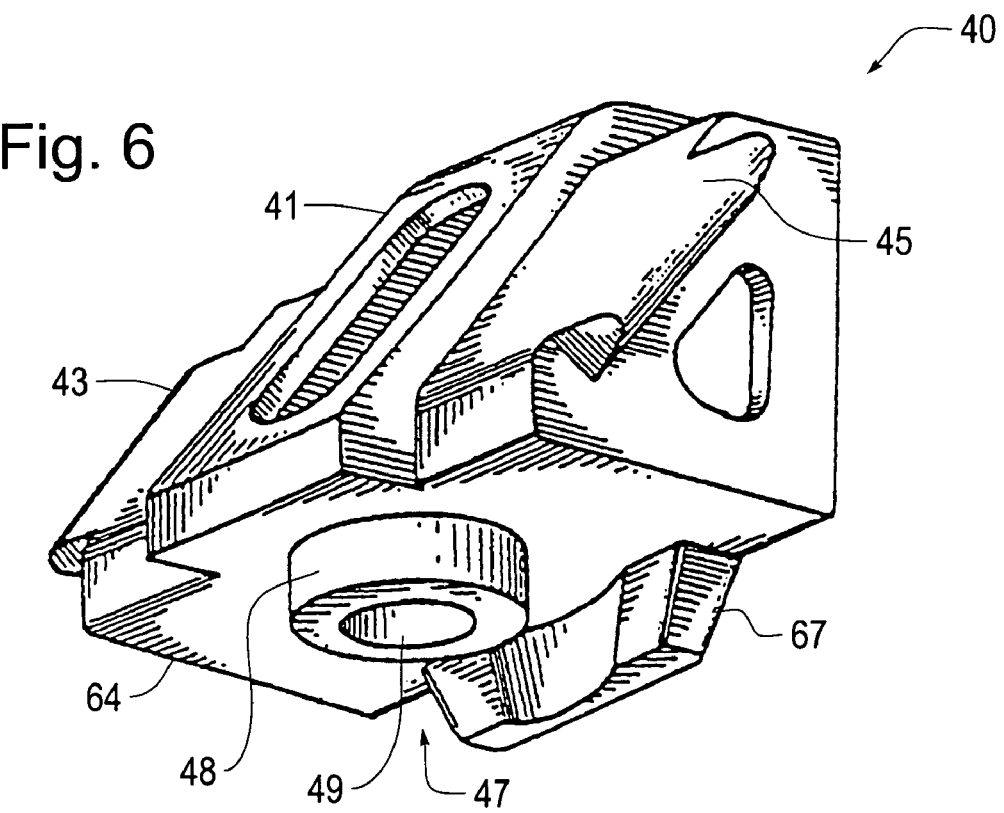
FIG. 6 is a lower elevational oblique view of a winged friction shoe.

Friction shoes 38, 40 operate as damping devices while sharing the load with the load springs 48. Friction shoe 40 in FIG. 6 is a winged friction shoe having central portion 41, first wing 43 and second wing 45. Friction shoe central portion 41 is slidably matable with slot 61 or 63 of bolster end 32, as shown in FIG. 4, to maintain friction shoe 40 in position and guide it during its vertical reciprocation as the railcar traverses the rail tracks. However, the biasing operation of control springs, subassemblies or couplets 50, 54 and 52, 56 provide a variable biasing action on their associated friction shoe 38, 40, which accommodates the dynamic operating range of the wheel-truck assembly 10 and car (not shown). In FIG. 6, annular disc or annulus 47, which is generally centrally positioned on lower surface 64, extends from lower surface 64 into control-coil spring 52 to maintain spring 52 in alignment. Spring 52 is in contact with lower shoe surface 64 and biases friction shoe 40 for damping of bolster 12 and truck 10, and thus the railcar.

In normal operation of a railcar, spring group 36 biases bolster 16 and, thus, the railcar is supported by bolster 16 at center plate 66. The biasing force controls or accommodates the oscillations or bouncing of the railcar, maintains railcar stability during traversal of the rail tracks and dampens any perturbations from various indeterminate influences, as noted above.

In typical prior configurations, friction shoes had a width of about 5.5" across friction face 62. However, in exemplary embodiments of the invention, it has been found that a wider friction shoe is beneficial to improve squaring and works well in conjunction with various other truck features, such as tuned spring group 36, to achieve a truck design that can meet recent AAR specifications for large railcars, such as M-976. In particular, it has been found that a "wide" friction shoe with a friction face 62 that is about 8" wide or even wider provides improved squareness. Increasing the width of the friction shoe decreases the amount of "sway" of the sideframes 12, 14 relative to bolster 16 during travel around curves. This makes the truck squarer at all times (i.e., the sideframes are substantially perpendicular to the bolster) and assists to return the truck to "square" after negotiating a turn. This reduces wear on the truck, wheels, and rail.

Alternative structures for the friction shoe and the friction shoe with spring group are noted in FIGS. 7A–7E, 8A and 8B. It should be noted that various friction shoe designs can be used with the railway truck suspension design of the present invention. The main key to improved performance is in the use of a friction shoe design in combination with other design features that improve the motion quality of the truck by increasing the squareness of the truck.

Figure 7A:
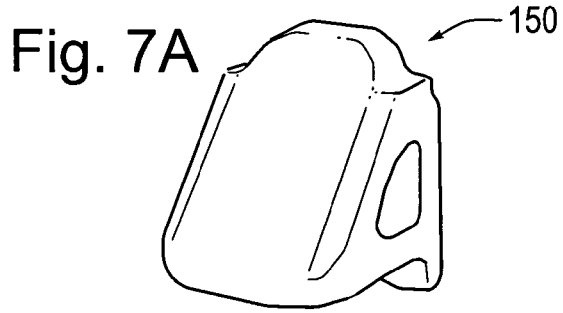
FIG. 7A is an oblique view of an alternate embodiment of a friction shoe.
Figure 7B:
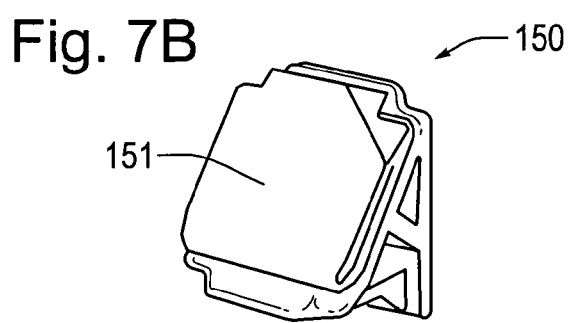
FIG. 7B is an oblique view of an alternate embodiment of a friction shoe.
Figure 7C:
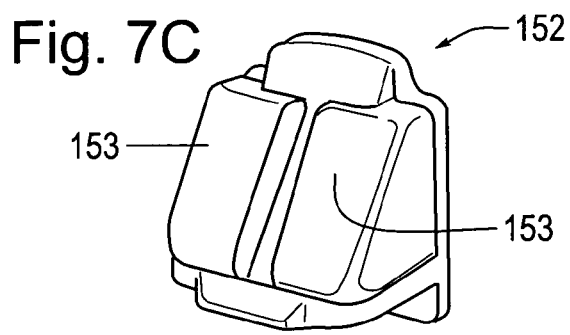
FIG. 7C is an oblique view of an alternate embodiment of a friction shoe.
Figure 7D:
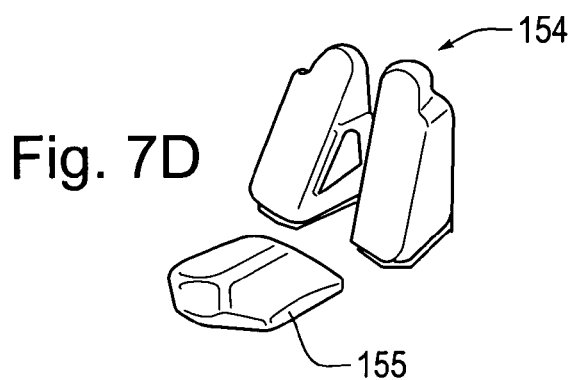
FIG. 7D is an exploded view of an alternate embodiment of a friction shoe.
Figure 7E:
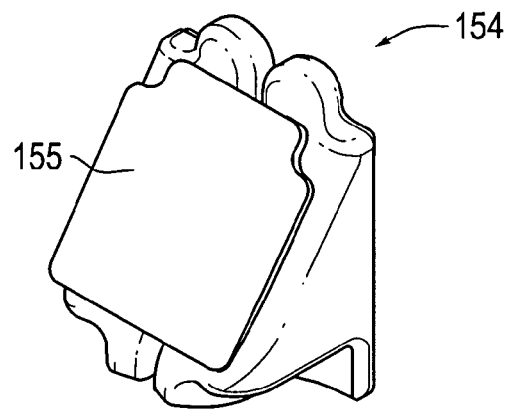
FIG. 7E is an oblique view of the friction shoe illustrated in FIG. 7D.

FIG. 7A illustrates a friction shoe 150 devoid of a double-wing structure. FIG. 7B illustrates the friction shoe 150 with a pad 151. FIG. 7C illustrates an alternate friction shoe 152 with twin pads 153. In FIGS. 7D and 7E another alternate friction shoe 154 is a split wedge structure having an insert 155. With this alternate friction shoe, insert 155 is welded into a bolster pocket. During travel, the two separate wedge elements making up friction shoe 154 spread outward when bolster 16 moves downward. This progressively increases the effective width of the friction shoe as travel increases to increase the biasing force applied, resulting in improved squareness comparable to that achieved with a fixed "wide" friction shoe design.

Figure 8A:
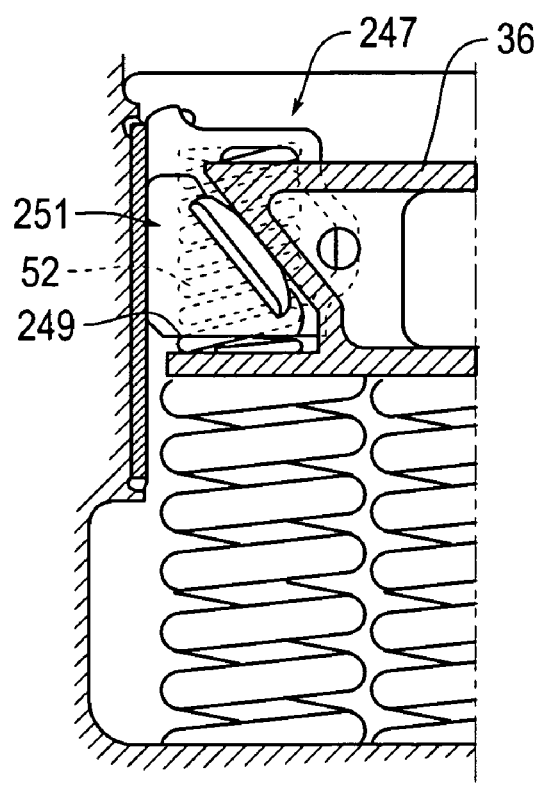
FIG. 8A is an elevational view of a constant damped suspension spring group in a sideframe with a friction shoe.
Figure 8B:
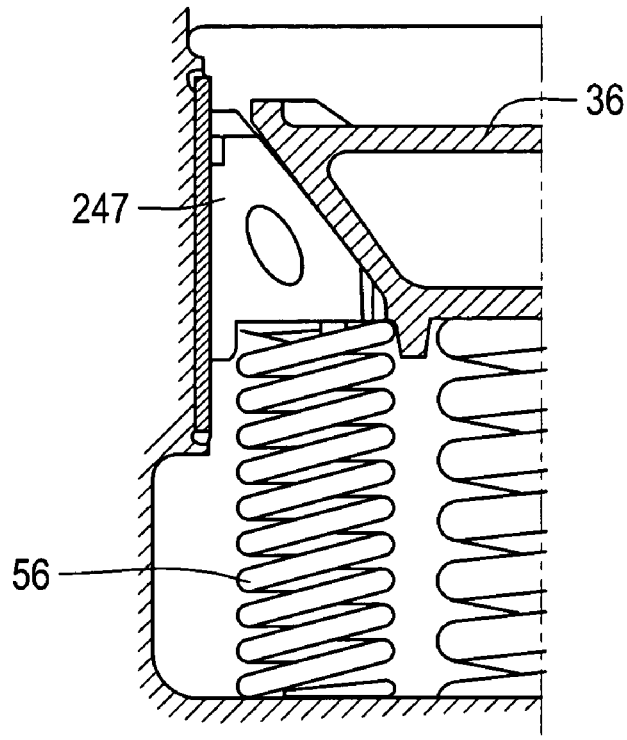
FIG. 8B is an elevational view of a variable damped suspension spring group in a sideframe with a friction shoe.

In FIG. 8A, second alternative friction shoe 247 is noted in an illustrative segment of a constant damped suspension spring group in a sideframe and bolster. In this structure, friction shoe 247 has lower port 249 open to internal chamber 251 of shoe 247. Control spring 52 in chamber 251 biases shoe 247 against bolster 36. In this structure, friction shoe 247 may have any form, such as a double-winged or single-sloped face. In FIG. 8B, the second alternative friction shoe 247 is noted in an illustrated variable damped suspension spring group of a sideframe and bolster in another embodiment of the present invention.

Figure 9:
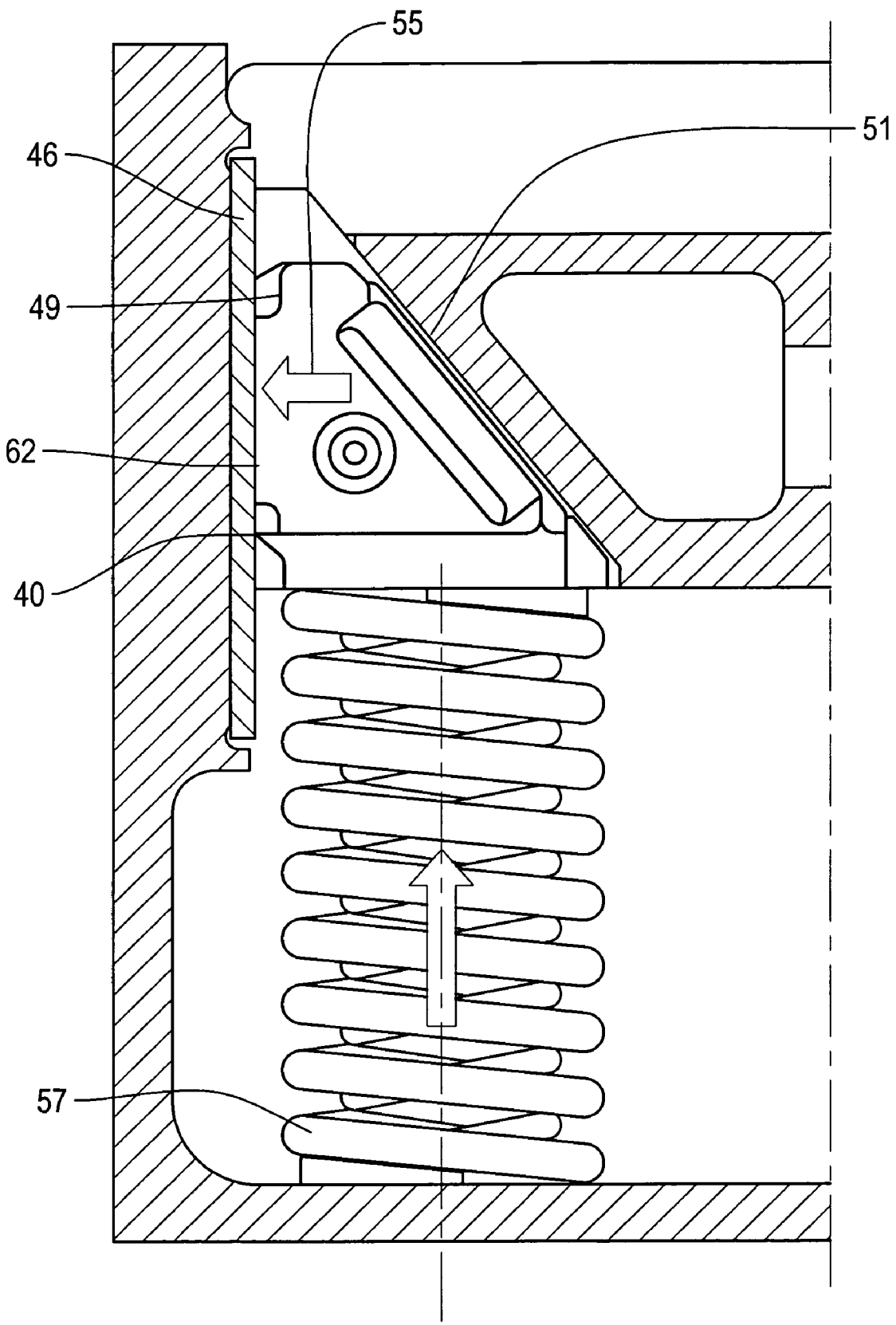
FIG. 9 is an elevational view of a spring group in a sideframe with a friction shoe.

As shown in FIG. 9, typical wear of the elements of the wheel-truck assembly (10 in FIG. 1) occur on wear face 46, friction face 62, and the friction shoe slope surface 51. Such wear causes the friction shoe to rise within the shoe pocket 63 of the bolster 16. As the friction shoe 40 rises, the control coil 57 decompresses causing a reduction in column load 55. Therefore, the measurement of the friction shoe height is a comprehensive measure of total control element wear. The friction shoe has a visual indicator 49 to determine when the friction shoe should be replaced based on face wear.

The damping action is frequently applied through apparatus, such as friction shoes 38 and 40, operable at the opposed bolster ends 32, 34 and at each forward and rear edge 58, 60. However, it is not simply the application of a biasing force to bolster end 32, 34 and friction shoes 38, 40, but the application of the static load (compressive force on the spring), that is the railcar weight at either an unloaded or fully laden weight. However, for any particular railcar, the railcar weight is a variable with a broad range extending from an empty-car, vehicle tare weight to a loaded-to-capacity railcar, and perhaps loaded above the rated, vehicle weight. As the railcar traverses the track, it experiences dynamic compressive forces on the springs, and it is susceptible to all the above-cited track conditions as well as countless others, which could contribute to oscillations. Spring group 36 and friction shoes 38, 40 act in concert to provide the requisite damping to the railcar and wheel-truck assembly 10 for its safe operation.

Figure 10A:
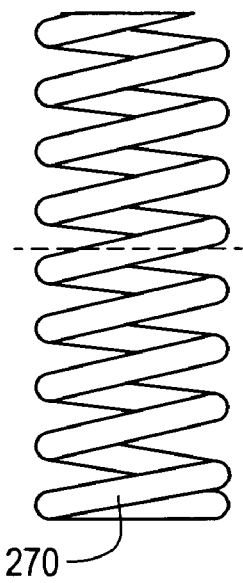
FIG. 10A is an exemplary spring at a spring free-height.
Figure 10B:
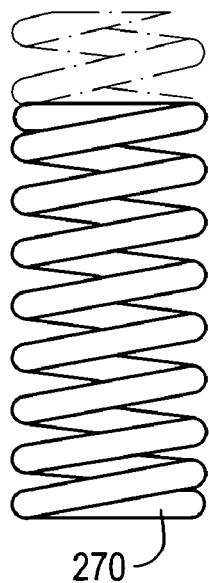
FIG. 10B is the spring of FIG. 10A compressed to a height at an empty-car condition.
Figure 10C:
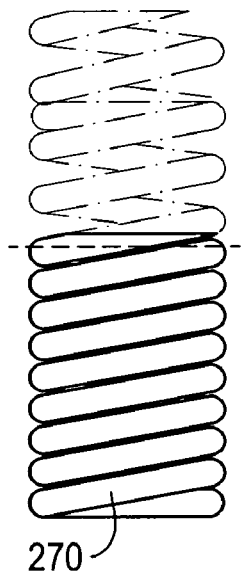
FIG. 10C is the spring of FIG. 10A compressed to a height at a loaded-to-capacity condition.

In FIG. 10A, an exemplary spring 270 is illustrated with spring free-height x and fully compressed or mechanically solid height A. In FIG. 10B, spring 270 has been compressed a compression distance y' to a static empty-car spring height y, and in FIG. 10C, the loaded-to capacity car compresses spring 270 to spring height z with a compressed distance z'. In a dynamic operation, the railcar will oscillate about the static heights, that is it will compress and expand the springs about these static heights. The distance A' in FIG. 10C is the reserve or safety distance designed into springs to accommodate any random car oscillations beyond normal expectations.

The structural and operational conflicts between decreased railcar weight and increased carrying capacity is a primary operating condition, which must be accommodated. Further complicating factors include the standards and specifications set by the AAR for railcars utilized in interchange, that is railcars not dedicated to a single user, which thus fall under the aegis of the AAR. The constraining weight factors lead to the operational constraints for the designer. Although the user wishes to maximize railcar carrying capacity while minimizing railcar weight, safe operational characteristics are a prime concern of both the railcar supplier and user.

Figure 11:
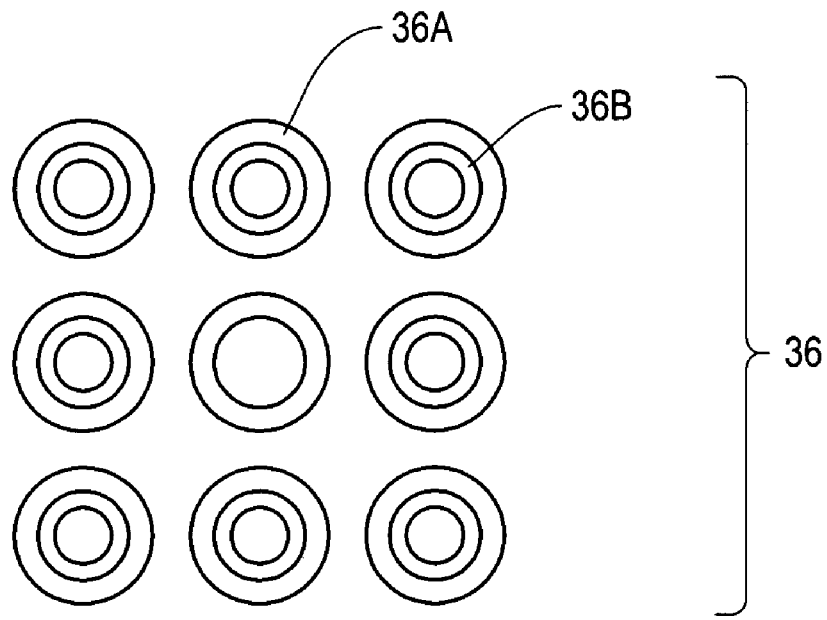
FIG. 11 is a plan view of a standard nine coil spring group configuration.
Figure 12:
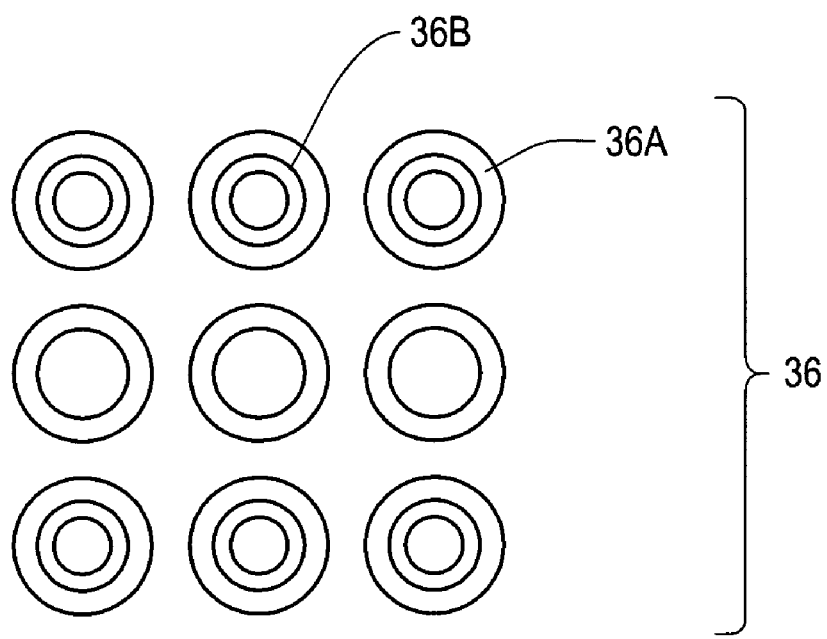
FIG. 12 is a plan view of a nine coil spring group configuration of a preferred embodiment.

Indicative of a railcar suspension and damping structure is spring group 36. The spring rate or response for an individual concentric spring arrangement, as well as the number of required springs of various arrangements needed in a specific spring group 36, will vary for a particular wheel-truck assembly 10 and style of railcar. By changing the number of springs, arrangement of springs, and/or type of springs, the riding quality and hunting threshold is significantly improved. For example, a standard nine coil spring group 36 includes nine outer springs 36A and eight inner springs 36B as illustrated in FIG. 11. For a 286,000 lb railcar and truck assembly (not shown) using this standard nine coil spring assembly design, the column load is 4,744 pounds, the group rate of the springs is 29,143 pounds per inch; the damping force is 2,134 pounds; and the reserve ratio is 1.61. Comparatively, for a "tuned" spring group design using 9 outer coils 36A and 6 inner coils 36B, as shown in FIG. 12, the column load is 5,996 pounds, the group rate of the springs is 26,061 pounds per inch; the damping force is 2,698 pounds; and the reserve ratio is 1.47. The tuned design increases the damping and reduces the spring reserve capacity according to the mass and geometry of the car body and truck location. Designing the suspension system in this manner requires reducing the reserve capacity to levels less than the AAR standard of 1.5. This has been tested on a number of cars and has shown to be a significant improvement in ride quality and hunting threshold.

Figure 13:
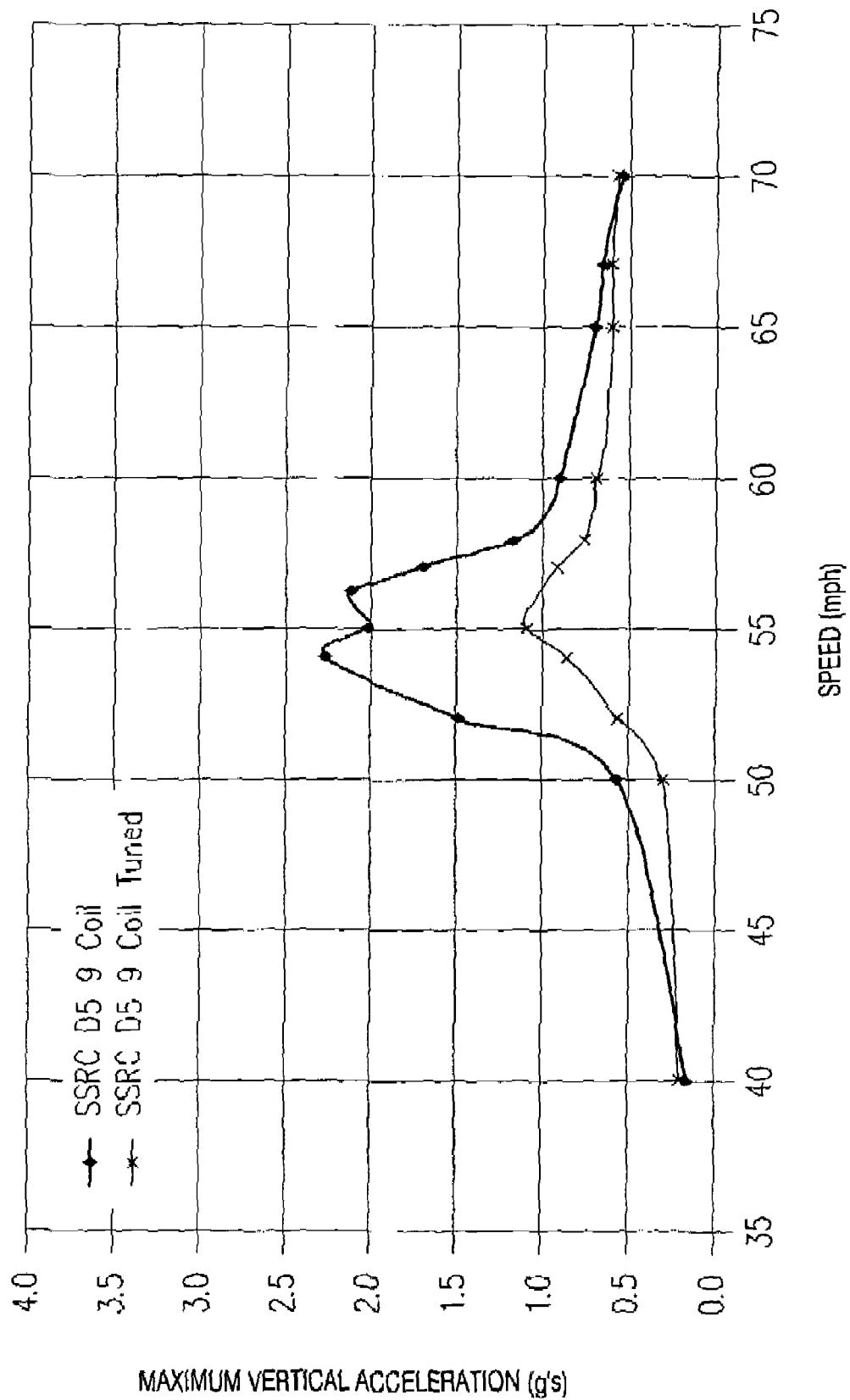
FIG. 13 is a graph of the vertical acceleration shown as a function of speed of the railcar.

Referring to FIG. 13, a chart showing the vertical acceleration of a railway car as a function of its speed is illustrated. As a 286,000 lb railcar and truck with the standard nine coil spring group approaches speeds up to 55 mph, the maximum recorded vertical acceleration approaches 2.5 g's. Comparatively, as a 286,000 lb railcar and truck with the tuned spring group design approaches speeds of 55 mph, the maximum vertical acceleration is near 1.1 g's. By decreasing the reserve capacity to less than 1.5, the maximum vertical acceleration is significantly reduced, improving ride quality and hunting threshold.

This tuned design provides improved ride quality, increased resistance to suspension bottoming, and increased hunting threshold speed of a railroad car and is thus a contributing factor in enabling a truck to meet new AAR truck performance specifications M-976, although use of the tuned spring group alone may not be sufficient for the truck to meet such new specifications. Rather, it may require a combination of several truck features, such as one or more of the following: elastomeric pedestal pads; long travel constant contact side bearings; "wide" or other friction shoes with increased squareness; and/or a lightweight cast frame. Preferred embodiments include at least the tuned spring group and long travel side bearings, but further may include the improved friction shoe design and/or the resilient pedestal pad. A most preferred embodiment uses all four truck features.

Figure 14:
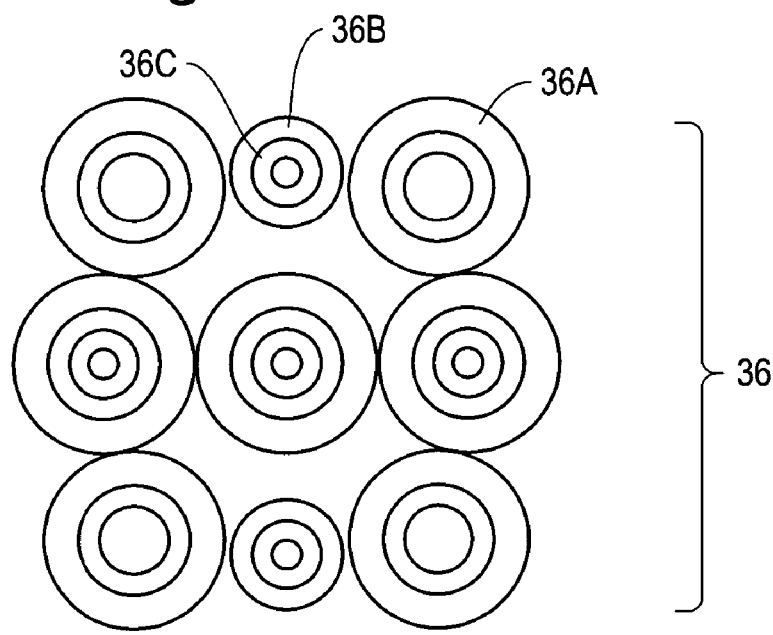
FIG. 14 is a plan view of a standard seven coil spring group configuration.
Figure 15:
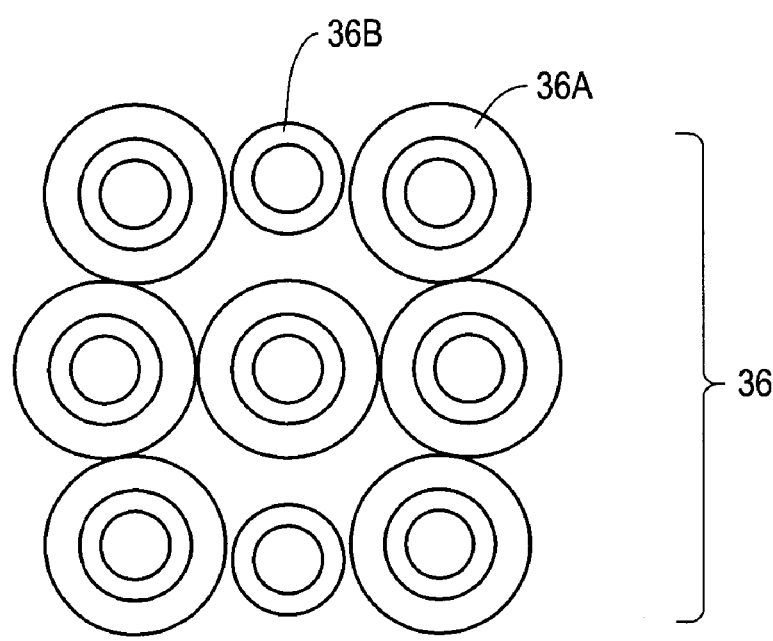
FIG. 15 is a plan view of a seven coil spring group configuration of a preferred embodiment.
Figure 16:
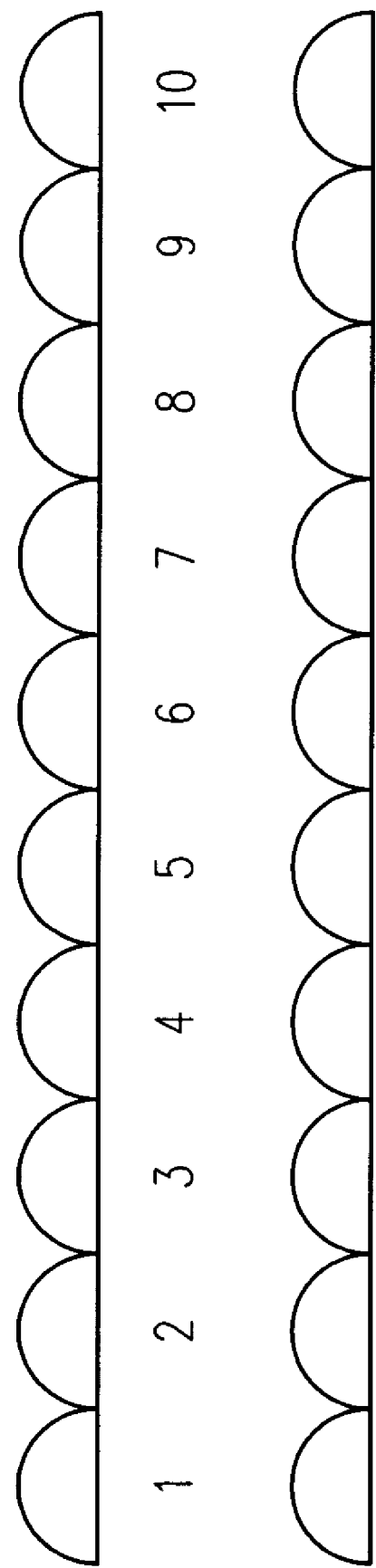
FIG. 16 is an illustration of track surface variation for pitch and bounce.

In another embodiment of the present invention, a standard seven coil spring design assembly is tuned to improve riding quality and hunting threshold. Specifically, a standard seven coil spring group 36 has 7 outer springs 36A, 9 inner springs 36B and 5 inner-inner springs 36C as shown in FIG. 14. For a 286,000 lb. railcar, this design has a column load of 4,744 lbs, a group rate of 30,562 pounds per inch, a damping force equal to 2,134 pounds and a reserve ratio of 1.57. By removing the inner-inner springs 36C and replacing the control spring, as shown in FIG. 15, for a 286,000 lb railcar, the column load increases to 5,996 pounds, the group rate decreases to 25,781 pounds, the damping force increases to 2,698 pounds, and the reserve ratio decreases to 1.42. Again, a reserve ratio less than 1.5 results in improved riding quality and hunting threshold.

It should be noted that a number of different standard coil spring designs are currently used, such as, for example, assemblies including 1) 9 outer springs with 7 inner springs; 2) 7 outer springs with 7 inner springs, 2 inner-inner springs and double control coils; 3) 7 outer springs with 7 inner springs and double control coils; 4) 7 outer springs with 7 inner springs, 2 inner-inner springs and double side coils; and 5) 6 outer springs with 7 inner springs, 4 inner-inner springs and double side coils. Each of these standard coil spring designs may be tuned as discussed above to have a reserve capacity of less than 1.5.

It is important to note that the tuned design is an example of a design for a particular length of car and the interaction of the suspension systems within the car. Spring assemblies for different car types are tuned such that optimum performance is achieved, which may result in a reserve ratio less than 1.5. By reducing the spring assembly reserve capacity for a railcar and truck of a given weight and configuration to less than 1.5, an unexpected result of a decrease in maximum vertical acceleration is achieved. The decrease in vertical acceleration allows for improved ride quality, increased resistance to suspension bottoming and increased hunting threshold speed of the railcar.

As described above, a preferred method of adjusting the reserve capacity of a spring group to less than 1.50, preferably to less than 1.49, more preferably to within the range of 1.35 to less than 1.48 and/or the range of 1.40 to less than 1.47, is to reduce the number of inner springs, including inner-inner springs, from the spring assembly previously used for a given railcar that had a spring assembly reserve capacity of greater than 1.5 as required by AAR specifications. The specific order and number of springs to remove in order to achieve the adjusted reserve capacity at the spring assembly is not particularly limited and can be readily determined for any given type of rail car by a practitioner in the art.

This particular arrangement with the proper coil diameter, spring rod diameter, spring material, and spring height has been found to provide the operational response that contribute to a truck being able to meet AAR truck performance specifications M-976.

This structural arrangement of FIGS. 12 and 15 is not the only spring configuration or arrangement available, but it fulfills the dimensional constraints of sideframe windows 18 and allows for improved ride quality, increased resistance to suspension bottoming, and increased hunting threshold speed of a railroad car. The operating response or characteristic of any spring coil is considered to be a limitation of the coil material, its heat treatment, the diameter of the rod or wire used to make the spring and the length or height of the spring. Therefore, it is considered that it would be conceivable to prepare a spring group 36 of a different configuration and having a different number of springs of different diameter, which spring group would be operable to meet the specification constraints to meet performance requirements, but with a reserve capacity less than 1.5.

Additional details on exemplary tuned spring groups can be found in co-pending application Ser. No. 10/770,463 filed Feb. 4, 2004, the disclosure of which is incorporated herein by reference in its entirety.

Another design consideration believed to be a contributing factor to enabling a truck to meet the new AAR truck performance specification M-976 is the use of long travel constant contact side bearings. A preferred ride control long travel side bearing design is that disclosed in co-pending application Ser. No. 10/808,535 filed Mar. 25, 2004, the disclosure of which is incorporated by reference herein in its entirety. However, other long travel side bearings capable of achieving at least ⅝" of travel can be used. Such long travel side bearings may use elastomer urging elements in place of one or more coil springs.

A first embodiment of a long travel side bearing according to the invention will be described with reference to FIGS. 17–22. Side bearing assembly 300 has a major longitudinal axis coincident with the longitudinal axis of a railway car. That is, when the side bearing is mounted on railway truck bolster 16 (only partially shown in FIG. 17), the major axis of the side bearing is perpendicular to the longitudinal axis of the bolster. That is, side bearing 300 is in line with axis 31 in FIG. 1 and bolster 16 is in line with axis 30 in FIG. 1.

Side bearing assembly 300 includes as main components, a base 310, a cap 320, and one or more resilient urging elements 330, such as a spring or elastomer element. In the exemplary embodiment shown, there are provided three springs, outer spring 330A, middle spring 330B and inner spring 330C that serve as the urging element, each of which may have a different spring constant to provide an overall combined load rating.

Base 310 is fixed to bolster 16 by suitable means. As shown, base 310 is bolted to bolster 16 by way of mounting bolts 340, washers 342 and mounting nuts 344 passing through mounting holes 346 provided on base flanges 312. Alternatively, base 310 could be riveted in place. Then, preferably, base 310 is welded to bolster 16 along at least transverse sides.

Figure 18:
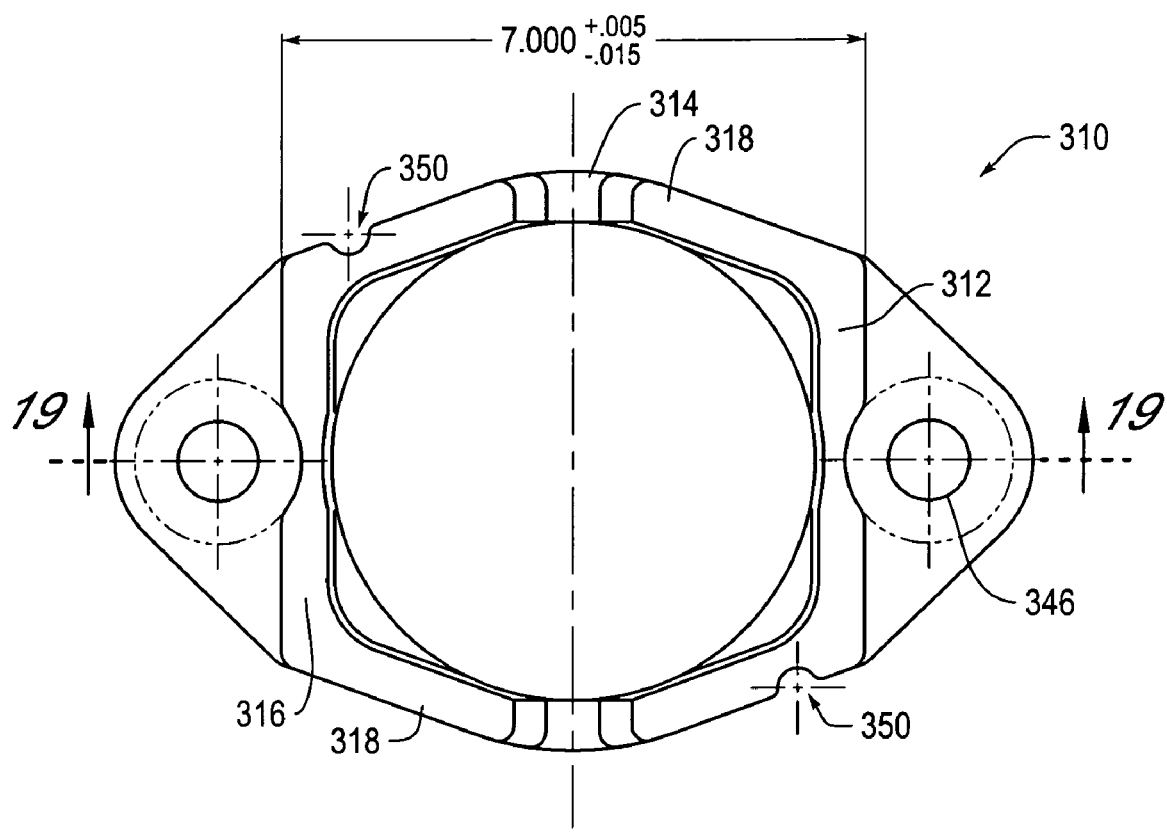
FIG. 18 is a top view of an exemplary side bearing base according to the invention.
Figure 19:
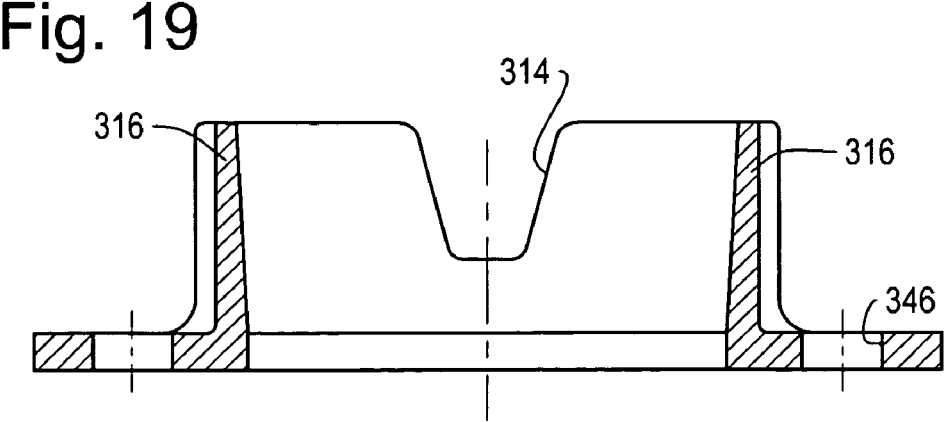
FIG. 19 is a cross-sectional view of the base of FIG. 18 taken along lines 19—19.

As best shown in FIGS. 18–19, base 310 has opposing side walls 316 and front and rear walls 318. Each of the front and rear walls 318 include a large, generally V-shaped opening. Opening 314 serves as a viewing window allowing visual inspection of the springs 330A–C during use of the side bearing. Opening 314 also serves to reduce weight of the base 310.

To increase the travel length of the side bearing, walls 316, 318 are reduced in total height by 5/16" from prior designs, such as that used in U.S. Pat. No. 3,748,001. This helps to achieve greater travel of the spring before cap 320 and base 310 mate and prevent further travel. In an exemplary embodiment, base 310 has a total height of 3.312" (+/−0.030), with walls 316, 318 extending approximately 2.812" above flange 312.

Figure 22:
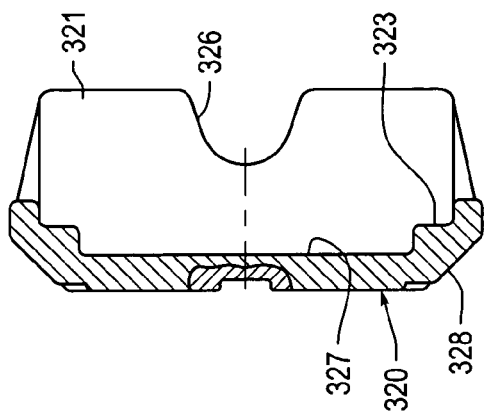
FIG. 22 is a cross-sectional view of the cap of FIG. 20 taken along lines 22—22 configured to receive one or a plurality of springs.
Figure 20:
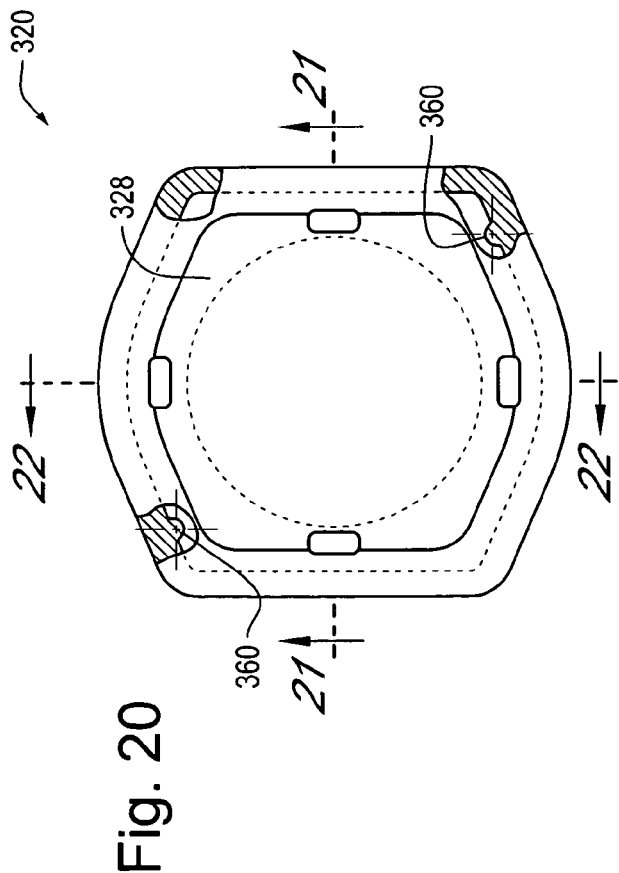
FIG. 20 is a top view of an exemplary side bearing cap according to the invention.
Figure 21:
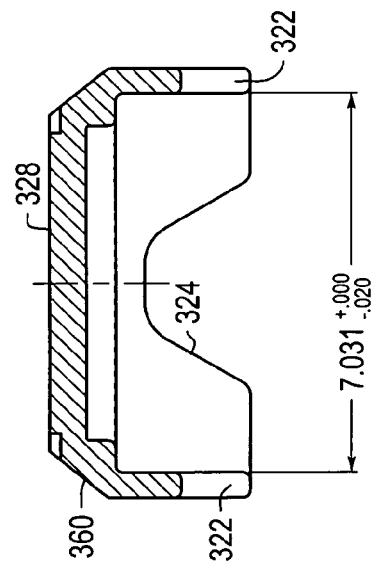
FIG. 21 is a cross-sectional view of the cap of FIG. 20 taken along lines 21—21.

Referring to FIGS. 20–22, cap 320 is cup-shaped and includes downwardly extending side walls 321, and downwardly extending front and rear walls 322 that surround base 310 in a telescoping fashion. Front and rear walls 322 are provided with a large, generally inverted V-shaped notch 324 corresponding in location with notch 314 on base 310 to assist in forming the viewing window. Side walls 321 also include a notch 326. The downwardly extending walls 321, 322 of cap 320 overlap base 310 in such a fashion that even when the spring(s) 330 are at their free height or in an uncompressed condition, there is still provided an amount of overlap between walls 321, 322 and walls 316, 318. This eliminates the need for a retaining pin to prevent separation of the cap relative to the base.

Cap 320 is further provided with a top contact surface 328, lower stop surface 323, and lower recessed spring support surface 327. Preferably, all peripheral edges 329 are coped. This serves several purposes. It reduces weight of the cap. Moreover, by coping the corners, there is a better contact surface that abuts against a car body wear plate (unshown but located on the underside of a car body immediately above cap 320 in use). In particular, by having coped corners, it has been found that less gouging occurs on the car body wear plate when the cap slides and rotates in frictional engagement with the car body wear plate during use. To further assist in a better contact surface, top contact surface 328 is formed substantially flat, preferably within 0.010" to further improve wear characteristics.

To assist in providing long travel of the springs, cap 320 is shortened similar to that of base 310. In an exemplary embodiment, cap 320 is shortened in height by 5/16" over previous designs to allow further travel of spring(s) 330 before cap 320 and base 310 mate and prevent further travel. Cap 320 preferably has a total cap height of 3.50", with side walls 321 and 322 extending downward approximately 2.88" below lower support surface 327. This allows the cap to overlap farther onto base 310 before sides 321, 322 hit flange 312.

As mentioned, the inventive side bearing cap 320 and base 310 can be used with one or more urging members, such as springs 330 or an elastomeric element (unshown). To achieve long travel of at least 5/8", it is preferable to reduce the spring solid height from that used in prior designs. This is because prior spring designs would have gone solid before 5/8" of travel was achieved. That is, the individual spring coils would have compressed against each other so that no further compression was possible.

Many exemplary spring configurations were designed and tested. Suitable exemplary versions are provided in table form in FIG. 23. Each of these are capable of travel during use of over 5/8" (0.625"). That is, each have a travel from a loaded height (such as 4.44") to a fully compressed height (such as 3.68") where the spring is fully compressed or the cap and base mate that exceeds 5/8" of travel. A preferred spring combination is set # 6.

Although three springs per side bearing are described in many embodiments, the invention in not limited to this and fewer, or even more, springs could be used. In fact, the number and size of side bearing springs may be tailored for a particular application. For example, lighter cars will use a softer spring rate and may use softer springs or fewer springs. Also, it has been found that better performance can be achieved through use of substantially softer spring constants than previously used. This has been found to provide a suspension system with a slower reaction time, which has been found to achieve improved tracking and curving, without adversely affecting hunting. This also has been found to result in reduced sensitivity to set-up height variations or component tolerances so as to achieve a more consistent preload on the truck system. This tends to equalize the loading and allow a railcar to stay more flat, with less lean or roll both statically and dynamically.

To obtain longer fatigue life, the material used for base 310 and cap 320 has been changed from Grade C steel to Grade E steel, which is harder and stronger. To assist in longer service life, hardened wear surfaces are provided on the outside surfaces of base walls 316. Additionally, to prevent excessive movements and accelerated wear, reduced longitudinal clearances between cap 320 and base 310 are provided by reducing the tolerances from prior values. This can be achieved, for example, more closely controlling the casting or other formation process of the cap 120 and base 110 side walls. For example, base 310 has a longitudinal distance of 7.000" (+0.005/−0.015) between outside surfaces of side walls 316 and internal surfaces of side walls 322 have a longitudinal distance of 7.031" (+0.000/−0.020). This results in a controlled minimum/maximum spatial gap of between about 0.006" to 0.024", which is a much tighter tolerance and smaller gap than previously used and results in substantially improved control of the truck. The minimum is achieved when base side walls 116 are at the maximum tolerance of 7.005" and the cap side walls are at the minimum tolerance of 7.011". The maximum is achieved when the base side walls 116 are at the minimum tolerance of 6.985" and the cap side walls 122 are at the maximum tolerance of 7.031". Also, it is important to keep the distance from top surface 327 to lower stop surface 323 at 1.25" (+/−0.030) so as to ensure travel of at least 5/8" before full compression of cap 320 on base 310.

Because of the possibility of various spring combinations, it is desirable to provide a safety feature that prevents interchangeability of improper components for a given application. To achieve this, exemplary embodiments provide keying features on both the cap 320 and base 310 to prevent mismatch of components. Also, caps 320 can be provided with spring lockout features that prevent improper combinations of springs to be used.

Figure 17:
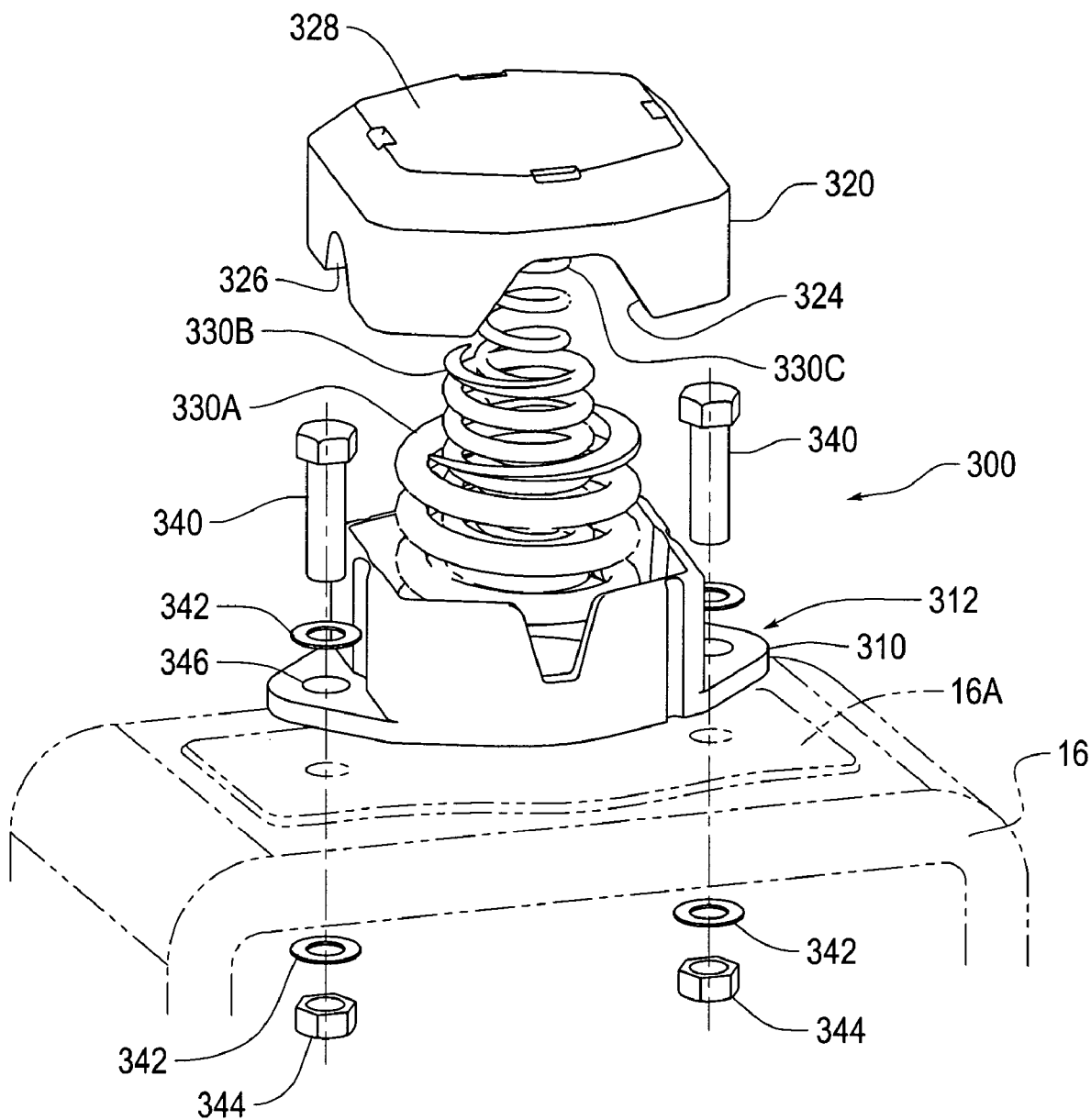
FIG. 17 is an exploded perspective view of an exemplary constant contact side bearing according to the invention.

A first exemplary embodiment in which all three springs 130A, 130B and 130C are used is shown back in FIG. 17. This application would be used for heavier railcars and can use any of the three-spring combinations listed in FIG. 23. However, a preferred combination of springs is set # 6 in FIG. 23. Use of a three-spring combination is particularly suitable for railcars in excess of 65,000 lbs, typically between 65,000 lbs and 110,000 lbs. Such cars are often boxcars, steel coal cars, multi-level auto rack cars and the like having a gross weight on rail ratings of 286,000 lbs.

This configuration includes a first keying feature configuration consisting of vertical half-circle recessed keying features 350 provided on opposite diagonal outside corners of base 310 (see FIG. 18) and corresponding vertical half-circle protruding keying features 360 (see FIG. 20) provided on corresponding inside corners of cap 320. With these keying features, base and caps for only this application will be allowed to mate and overlap. This prevents mismatching of components. Moreover, the keying features 350, 360 preferably prevent improper orientation of components. For example, the keying feature should preferably prevent use of a proper cap, but rotated 180° from a correct orientation.

Different keying features may be provided for other applications, such as medium or lightweight railcars. Additional details of alternative embodiments can be found in co-pending application Ser. No. 10/808,535, filed Mar. 25, 2004.

Figure 24:
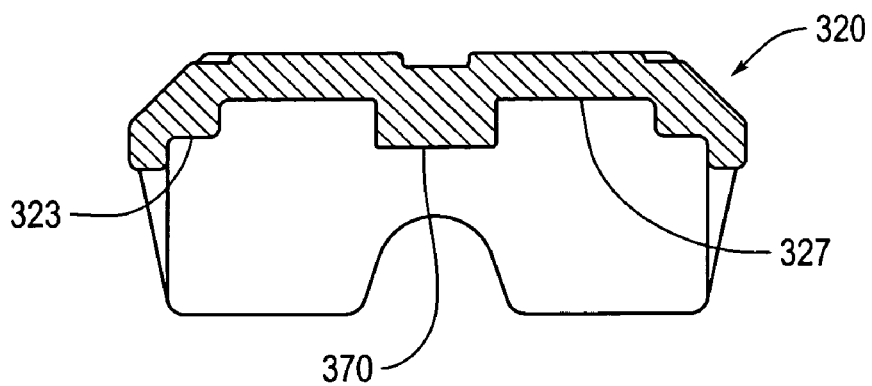
FIG. 24 is a cross-sectional view of the side bearing cap of FIG. 20 taken along lines 22—22 showing a first exemplary spring lockout configuration.
Figure 25:
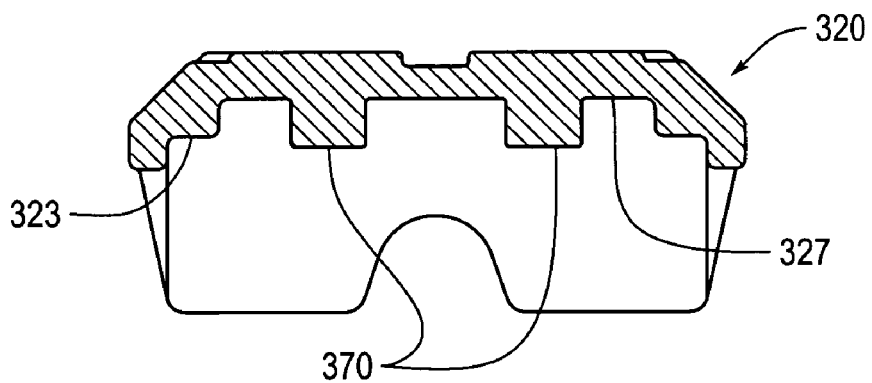
FIG. 25 is a cross-sectional view of the side bearing cap of FIG. 20 taken along lines 22—22 showing a second exemplary spring lockout configuration.
Figure 26:
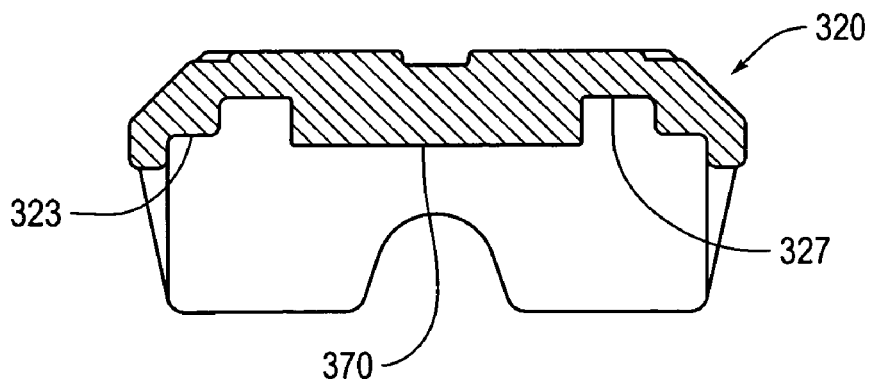
FIG. 26 is a cross-sectional view of the side bearing cap of FIG. 20 taken along lines 22—22 showing a third exemplary spring lockout configuration, useable with a single, large spring.

The use of the above keying features 350, 360 achieve proper matching of base and cap components. However, additional features are needed to ensure that the proper spring combinations are used for a particular application. The embodiment of FIG. 17 uses all three springs. Because of this, there is no need for a spring lockout feature. As such, the underside of cap 320 in this embodiment will appear as in FIG. 22. However, in other embodiments, various combinations of springs 330A–C may be used. To prevent usage of spring 330C, lower recessed spring support surface 327 of cap 320 in FIG. 24 is provided with a suitable spring lockout feature 370 that prevents insertion of an improper spring. In this case, spring lockout feature 370 may be a boss that protrudes downwardly and is sized to prevent use of small spring 330C, but is sized to not interfere with placement of springs 330A or 330B against spring support surface 327 on the interior of cap 320. Similarly, to prevent usage of the middle spring 330B, lower recessed spring support surface 327 of cap 320 may be provided with a second, exemplary spring lockout feature 370 that protrudes downwardly and prevents use of middle spring 330B, without interfering with placement of springs 330A or 330C, as shown in FIG. 25. Other configurations of a spring lockout feature 370 are contemplated. For example, if only outer spring 330A is desired to be used, a third exemplary spring lockout feature 370 could be provided as in FIG. 26 to prevent use of both the inner and middle springs 330B and 330C. Thus, the combination of base and cap keying features 350, 360 and the spring lockout features 370 prevent interchanging of improper components for a particular application.

Additional advantages are achieved by use of specific spring constants in the inventive side bearing. Prior three-spring designs had dramatically higher spring constants, which were believed to be necessary to achieve proper load support and cushion to the railcar. For example, for a 65,000 lb. railcar many prior designs had a combined load rating of about 7100 lb/in (3705 lb/in for the outer spring, 2134 lb/in for the middle spring, and 1261 lb/in for the inner spring). The top example in FIG. 23 falls into this category. However, it has been found that substantially improved ride and load balancing characteristics can be achieved by dramatically reducing the load rate of the springs, in effect making them much softer. Many benefits can be achieved if the combined load rating is between about 4,000–6,000 lbs/in. If the rate is lowered much below 4,000 lb/in, it is possible that the side bearing will disengage from contact with the bottom of the car body, which is undesirable. As the load rate increases towards 6,000 lb/in, similar benefits can be achieved. However, the higher in this range, the more sensitive the springs are to manufacturing tolerance and set-up deviations.

A preferred embodiment according to the invention is shown at the bottom of FIG. 23 (Example #6) and uses a total combined load rate of about 4506 lb/in (2483 lb/in for the outer spring, 1525 lb/in for the middle spring, and 498 lb/in for the inner spring). A spring combination near the bottom of the preferred range of 4,000–6,000 lb/in. has been found particularly suitable for several reasons. First, it allows the side bearing to become less sensitive to set-up height variations and tolerances. That is, small deviations from one side bearing to another on a truck have been found to have little effect on the achieved preload. Thus, a spring with this range of preload has been found to be capable of a more consistent preload from side bearing to side bearing, even if there are minor set-up height or other tolerance variations or non-uniformities. This tends to equalize the loading and allow a railcar to stay more flat, with less lean or roll both statically and dynamically. Second, such lowered rates provide a suspension system with a slower reaction time, which has been found to achieve improved tracking and curving, without adversely affecting hunting. However, as mentioned, increased spring rates approaching 6,000 lb/in. can be used. However, to achieve similar performance, various design tolerances must be more tightly controlled, because as the spring rate increases towards 6,000 lb/in., the sensitivity to set-up and tolerance variances increases. Thus, without appropriate control of these tolerances, such deviations may result in unlevel loading, resulting in undesirable lean of the car body from a flat state if one side bearing on the truck is not set-up the same as the other.

This combination of features has also achieved great weight reduction from prior designs. For example, the exemplary side bearing 100 has been found to have a weight of only 47.3 pounds, which is down from 55.9 pounds of prior designs.

Another design consideration believed to be a contributing factor in enabling a truck to meet new AAR truck performance specifications M-976 is the use of an elastomeric pedestal pad. A suitable elastomeric pedestal pad is disclosed in U.S. Pat. No. 6,371,033 to Smith, the disclosure of which is incorporated by reference herein in its entirety.

Referring back to FIG. 1, each typical car truck 10 includes a pair of sideframes 12, 14 supported on wheel sets 20, 22. A hollow bolster 16 extends between and is supported on spring groups 36 mounted on the sideframes. Sideframes 12, 14 comprise a top member 400, compression member 410, tension member 420, column 430, pedestal 440, pedestal roof 450, bearings 460 and bearing adapters 470. Each end of bolster 16 includes a protruding wing, referred to as a gib, 480. Each end of sideframes 12, 14 is provided with a pedestal 440 which is sized to be respectively engaged with bearing assemblies 460 and may include an opening that is engaged with bearing adapters 470. In most prior designs, the bearing adapter 470 directly contacted and rubbed on pedestal roof 450. However, it has been found that the use of a resilient elastomer pedestal pad 490, which heretofore has been used only on very limited applications, between the pedestal roof 450 and the bearing adapter 470 reduces wheel to rail forces and works with other inventive truck features to improve the motion control of the truck and helps to achieve a truck design that meets M-976 specifications.

A preferred pedestal pad is the Pennsy AdapterPlus system. This pad interacts between the sideframe and the adapter to improve curving performance. The Pennsy AdapterPlus is commercially available from Pennsy Corporation of West Chester, Pa. Another type of pedestal pad is an elastomeric pad made by the Lord Corporation that is made from natural rubber. It is fatigue resistant and very stiff vertically. As such, it can support the load of the railcar. However, it works in shear so that in turns or curves it acts to straighten the truck assembly upon exiting the curve. By reducing the wheel to rail forces, wear is improved, as well as ride control. Thus, curving performance is greatly improved while reducing truck component wear.

As such, the invention provides a combination of design features that work in harmony to achieve improved motion control that improves ride quality, increases resistance to suspension bottoming, increases hunting threshold speed, improves squaring, improves curving performance, and has improved wear properties so as to meet or exceed recent AAR truck specification M-976. This combination of features includes two or more of the following features: a "tuned" spring group, long travel constant contact side bearings, a "wide" or other friction shoe with increased squareness, and/or an elastomeric pedestal pad.

While only specific embodiments of the invention have been described and shown, it is apparent that various alternatives and modifications can be made thereto. Those skilled in the art will also recognize that certain additions can be made in these illustrative embodiments. It is, therefore, the intention in the appended claims to cover all such alternatives, modifications and additions as may fall within the true scope of the invention.

What is claimed is:

1. A railway car truck with a railway car thereon having a gross weight on rail rating of at least 286,000 pounds, comprising:
   two sideframes, each sideframe having a pedestal formed on opposite ends thereof and substantially upright columns defining a sideframe opening intermediate the pedestals, friction surfaces being provided on the upright columns, each pedestal having a pedestal opening sized to receive a bearing adapter;
   a bolster transversely situated relative to the sideframes and supported within the sideframe openings, the bolster including side bearing pads on an upper surface of the bolster between the sideframes;
   a truck suspension consisting of a spring group provided in each sideframe opening that supports respective ends of the bolster, the spring group having a minimum reserve capacity of less than 1.5;
   and at least one of the following:
   long travel side bearings provided on each side bearing pad, the long travel side bearings including a base, a cap, and at least one resilient urging element having a travel of at least ⅝" before the urging element is fully compressed or the base and cap bottom out;
   high squareness friction shoes disposed between the bolster and the sideframe openings, each friction shoe including a substantially vertical wall engageable with the friction surface on the upright columns and a friction face; and
   an elastomeric pad disposed on a roof of the pedestal opening so as to be disposed between the pedestal and the bearing adapter in use.

2. The railway car truck according to claim 1, wherein the friction shoes have an effective friction face of at least about 8 inches.

3. The railway car truck according to claim 2, wherein the friction shoes are of a split wedge design having two separate shoe members and an insert member, the two separate shoe members being spread outward during bolster travel to achieve the effective friction face.

4. The railway car truck according to claim 2, wherein the friction shoes are a compound slope angle shoe.

5. The railway car truck according to claim 2, wherein the friction shoes have a fixed bias.

6. The railway car truck according to claim 2, wherein the friction shoes have a variable bias.

7. The railway car truck according to claim 1, wherein the truck includes at least long travel side bearings, a truck suspension with a reserve capacity of less than 1.5, and high squareness friction shoes having an effective friction face of at least about 8 inches.

8. The railway car truck according to claim 1, wherein the truck includes at least long travel side bearings, a truck suspension with a reserve capacity of less than 1.5, and an elastomeric pad disposed on a roof of the pedestal opening so as to be disposed between the pedestal and the bearing adapter in use.

9. The railway car truck according to claim 8, wherein the elastomeric pad is formed from natural rubber or plastic.

10. The railway car truck according to claim 1, wherein the long travel side bearings have a combined load rating of between about 4,000 to 6,000 lb/in.

11. The railway car truck according to claim 10, wherein the long travel side bearings have a longitudinal spatial gap between the base and the cap of between about 0.006–0.046 inches.

12. The railway car truck according to claim 1, wherein the long travel side bearings have a resilient urging member in the form of at least one coil spring.

13. A railway car truck for use with a railway car having a gross weight on rail rating of at least 286,000 pounds, comprising:
    two sideframes, each sideframe having a pedestal formed on opposite ends thereof and substantially upright columns defining a sideframe opening intermediate the pedestals, friction surfaces being provided on the upright columns, each pedestal having a pedestal opening sized to receive a bearing adapter;
    a bolster transversely situated relative to the sideframes and supported within the sideframe openings, the bolster including side bearing pads on an upper surface of the bolster between the sideframes;
    long travel side bearings provided on each side bearing pad, the long travel side bearings including a base, a cap, and at least one resilient urging element having a travel of at least ⅝" before the urging element is fully compressed or the base and cap bottom out;
    a truck suspension consisting of a spring group provided in each sideframe opening that supports respective ends of the bolster, the spring group having a minimum reserve capacity of less than 1.5;
    high squareness friction shoes disposed between the bolster and the sideframe openings, each friction shoe including a substantially vertical wall engageable with the friction surface on the upright columns and a friction face, wherein the friction shoes maintain substantial squareness of the bolster with the sideframes; and
    an elastomeric pad disposed on a roof of the pedestal opening so as to be disposed between the pedestal and the bearing adapter in use.

14. The railway car truck according to claim 13, wherein the friction shoes have an effective friction face of at least about 8 inches.

15. The railway car truck according to claim 14, wherein the friction shoes are of a split wedge design having two separate shoe members and an insert member, the two separate members being spread outward during bolster travel to achieve the effective friction face.

16. The railway car truck according to claim 13, wherein the friction shoes are a compound slope angle shoe.

17. The railway car truck according to claim 13, wherein the long travel side bearings have a resilient urging member in the form of at least one coil spring.

18. The railway car truck according to claim 13, wherein the elastomeric pad is formed from natural rubber or plastic.

19. The railway car truck according to claim 13, wherein the long travel side bearings have a combined load rating of between about 4,000 to 6,000 lb/in.

20. The railway car truck according to claim 19, wherein the long travel side bearings have a longitudinal spatial gap between the base and the cap of between about 0.006–0.046 inches.

21. The railway car truck according to claim 13, wherein the friction shoes have a fixed bias.

22. The railway car truck according to claim 13, wherein the friction shoes have a variable bias.

* * * * *